US011506421B2

(12) United States Patent
Funabiki et al.

(10) Patent No.: US 11,506,421 B2
(45) Date of Patent: Nov. 22, 2022

(54) WATER HEATING DEVICE

(71) Applicant: NORITZ CORPORATION, Hyogo (JP)

(72) Inventors: Tsuneo Funabiki, Kakogawa (JP); Keiichi Miura, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 15/733,889

(22) PCT Filed: Aug. 14, 2019

(86) PCT No.: PCT/JP2019/031910
§ 371 (c)(1),
(2) Date: Dec. 1, 2020

(87) PCT Pub. No.: WO2020/040013
PCT Pub. Date: Feb. 27, 2020

(65) Prior Publication Data
US 2021/0131702 A1 May 6, 2021

(30) Foreign Application Priority Data

Aug. 24, 2018 (JP) .............................. JP2018-157014
Aug. 24, 2018 (JP) .............................. JP2018-157015

(51) Int. Cl.
*F24H 9/02* (2006.01)
*F23L 5/02* (2006.01)
(Continued)

(52) U.S. Cl.
CPC .................. *F24H 9/02* (2013.01); *F23L 5/02* (2013.01); *F04D 29/44* (2013.01); *F16L 19/02* (2013.01);
(Continued)

(58) Field of Classification Search
CPC .... F24H 9/02; F23L 5/02; F04D 29/44; F16L 41/086; F16L 19/025; F16L 19/02;
(Continued)

(56) References Cited

U.S. PATENT DOCUMENTS 3,861,722 A * 1/1975 Kenyon .................. F16L 23/02
285/337
4,079,970 A * 3/1978 Brett ....................... F16L 23/04
285/136.1

(Continued)

FOREIGN PATENT DOCUMENTS

EP            2552533 B2 *  2/2013  ............ B01L 3/5055
JP           S56134486       10/1981
(Continued)

OTHER PUBLICATIONS

JP-2552533-B2_translation, See Foreign Pantent Documents, translation of publication from 2013.*
(Continued)

*Primary Examiner* — Michael G Hoang
*Assistant Examiner* — Andrew W Cheung
(74) *Attorney, Agent, or Firm* — JCIPRNET

(57) ABSTRACT

A water heating device equipped with a housing, a fan and a chamber arranged in the interior of the housing, and screws. The housing has first and second side plates which oppose one another in a first direction and extend from the ends of a back plate along a second direction intersecting the first direction. An opening part is provided in the housing on the side opposite the back plate in the second direction. The fan has a discharge opening, a first flow passage extending along the first direction, and a first flange. The chamber has an intake opening, a second flow passage extending along the first direction, and a second flange. The first and the second flanges are secured by screws. In a planar view, the (Continued)

center axis of the screws is slanted such that a head portion is closer to the opening part than the tip-end portion.

12 Claims, 21 Drawing Sheets

(51) Int. Cl.
 *F16L 23/036* (2006.01)
 *F16L 23/02* (2006.01)
 *F16L 19/02* (2006.01)
 *F16L 23/04* (2006.01)
 *F04D 29/44* (2006.01)

(52) U.S. Cl.
 CPC .............. *F16L 23/02* (2013.01); *F16L 23/036* (2013.01); *F16L 23/04* (2013.01)

(58) Field of Classification Search
 CPC ......... F16L 23/024; F16L 23/04; F16L 21/06; F16L 23/02; F16L 23/036; F23D 14/02
 USPC ............................................. 60/524; 285/206
 See application file for complete search history.

(56) References Cited

U.S. PATENT DOCUMENTS

| | | | |
|---|---|---|---|
| 4,397,486 A | 8/1983 | Ohya | |
| 6,302,452 B1 * | 10/2001 | Schlicht | F16L 23/036 285/368 |
| 9,168,585 B2 * | 10/2015 | Schell | F16L 17/04 |
| 10,508,829 B2 * | 12/2019 | Ojiro | F23Q 3/00 |
| 10,605,485 B2 * | 3/2020 | Ojiro | F24H 9/02 |
| 2008/0258462 A1 | 10/2008 | Kumakawa | |
| 2018/0195760 A1 | 7/2018 | Kouduki | |
| 2018/0313577 A1 * | 11/2018 | Ojiro | F24H 9/02 |

FOREIGN PATENT DOCUMENTS

| | | | | |
|---|---|---|---|---|
| JP | S62-19029 | | 5/1987 | |
| JP | 2552533 | | 11/1996 | |
| JP | H09228833 | | 9/1997 | |
| JP | 2006118522 | | 5/2006 | |
| JP | 2008286382 | | 11/2008 | |
| JP | 2017083044 A * | | 5/2017 | F24H 9/02 |
| JP | 2018112321 | | 7/2018 | |
| WO | WO-2009121189 A1 * | | 10/2009 | F16L 23/02 |

OTHER PUBLICATIONS

JP 2017083044 A machine translation from Global Dossier (Year: 2022).*

"International Search Report (Form PCT/ISA/210) of PCT/JP2019/031910", dated Nov. 19, 2019, with English translation thereof, pp. 1-9.

"Office Action of Japan Counterpart Application" with English translation thereof, dated Jul. 26, 2022, p. 1-p. 12.

* cited by examiner side of opening part 10d side of opening part 10d side of opening part 10d

WATER HEATING DEVICE

CROSS-REFERENCE TO RELATED APPLICATION

This application is a 371 application of the International PCT application serial no. PCT/JP2019/031910, filed on Aug. 14, 2019, which claims the priority benefit of Japan Patent Application No. 2018-157014, filed on Aug. 24, 2018 and Japan Patent Application No. 2018-157015, filed on Aug. 24, 2018. The entirety of each of the above-mentioned patent applications is hereby incorporated by reference herein and made a part of this specification.

TECHNICAL FIELD

The present invention relates to a water heating device.

BACKGROUND ART

Japanese Patent Laid-Open. No. 2018-112321 (Patent Literature 1) describes a water heating device. The water heating device described in Patent Literature 1 includes a housing, a chamber, and a fan. The chamber and the fan are disposed in the housing.

The housing includes a back plate portion and a pair of side plate portions. The pair of side plate portions (a first side plate portion and a second side plate portion) extends forward from both side ends of the back plate portion. The housing has an opening part formed on a front side thereof. The chamber is disposed in the housing. The chamber includes a first attachment surface and an intake opening. The first attachment surface is slanted with respect to the back plate portion in a planar view. The intake opening opens diagonally forward on the first attachment surface.

The fan includes a second attachment surface provided with a discharge opening. The fan is attached to the chamber while the first attachment surface opposes the second attachment surface so that the intake opening and the discharge opening communicate with each other. The first attachment surface and the second attachment surface are secured to each other by a screw. The screw is threaded into a screw hole formed in the first attachment surface and the second attachment surface. The screw hole is formed to be orthogonal to the first attachment surface and the second attachment surface.

REFERENCE LIST

Patent Literature

Patent Literature 1: Japanese Patent Laid-Open. No. 2018-112321

SUMMARY

Technical Problem

In the water heating device described in Patent Literature 1, a mixed gas discharged from the fan is sucked into the chamber in a direction slanted with respect to the back plate portion in a planar view. That is, the mixed gas discharged from the fan cannot be sucked into the chamber in a direction from the first side plate portion to the second side plate portion.

If the chamber and the fan are disposed so that the mixed gas discharged from the fan is sucked into the chamber in a direction from the first side plate portion to the second side plate portion in the water heating device described in Patent Literature 1, it is difficult to secure the first attachment surface and the second attachment surface by a screw.

The invention has been made in view of the above-described problems of the related art. More specifically, the invention provides a water heating device capable of supplying a mixed gas into a chamber in a direction from a first side plate to a second side plate and easily connecting a fan and the chamber to each other through an opening part provided in a housing.

Solution to Problem

A water heating device according to an aspect of the invention includes a housing, a fan and a chamber disposed in the housing, and a screw. The housing includes a first side plate and a second side plate which oppose each other in a first direction and extend from both side ends of a back plate in a second direction intersecting the first direction. The housing is provided with an opening part on the side opposite to the back plate in the second direction.

The fan includes a discharge opening, a first flow passage which extends in the first direction toward the discharge opening, and a first flange which is provided in the discharge opening to project from an outer peripheral surface of the first flow passage. The chamber includes an intake opening, a second flow passage which extends in the first direction from the intake opening, and a second flange which is provided in the intake opening to project from an outer peripheral surface of the second flow passage.

The first flange and the second flange are secured to each other by the screw while the discharge opening and the intake opening are in contact with each other in a communication state. The screw includes a head portion and a tip-end portion which is located on the side opposite to the head portion in a direction along a center axis of the screw. The center axis of the screw is slanted so that the head portion side is closer to the opening part than the tip-end portion side in a planar view.

In the water heating device, the first flow passage and the second flow passage extend in the first direction. Therefore, the mixed gas discharged from the fan is supplied into the chamber in the first direction. In the water heating device, the center axis of the screw is slanted so that the head portion side is closer to the opening part than the tip-end portion side in a planar view. Therefore, an operator can easily connect the chamber and the fan to each other through the opening part of the housing.

In the water heating device, the first flange may include a first surface which is in contact with the second flange and a second surface which is a surface on the side opposite to the first surface. The second surface may include a seat surface portion which is provided with a through-hole through which the screw is inserted and is slanted to intersect the center axis of the screw in a planar view.

In the water heating device, the center axis of the screw may be slanted so that a virtual line formed by extending the center axis of the screw passes through the opening part in a planar view.

In the water heating device, the second flange may include a third surface which is in contact with the first flange. The third surface may include a concave portion. A bottom surface of the concave portion may be provided with a screw hole into which the screw is threaded. In this case, since a tool for forming a screw hole such as a tap does not easily deviate from a position where the screw hole is to be formed, the screw hole can be formed with high accuracy.

In the water heating device, the screw hole may penetrate the second flange. In this case, chips generated when forming the screw hole can be easily discharged.

In the water heating device, an outer peripheral surface of the first flange may include a first flat surface portion. The chamber may include a second flat surface portion which is in contact with the first flat surface portion. In this case, since the first flat portion and the second flat portion are in contact with each other, the rotation of the fan around the rotation axis parallel to the first direction can be suppressed.

A water heating device according to another aspect of the invention includes a housing, a fan, a chamber, and a sandwiching member. The housing includes a back plate and first and second side plates opposing each other in a first direction and extending from both side ends of the back plate in a second direction intersecting the first direction. The housing is provided with an opening part on the side opposite to the back plate in the second direction.

The fan and the chamber are disposed in the housing. The fan includes a discharge opening, a first flow passage which extends in the first direction toward the discharge opening, and a first flange which is provided in the discharge opening to project from an outer peripheral surface of the first flow passage. The chamber includes an intake opening, a second flow passage which extends in the first direction from the intake opening, and a second flange which is provided in the intake opening to project from an outer peripheral surface of the second flow passage.

The first flange and the second flange are in contact with each other so that the discharge opening and the intake opening communicate with each other. The sandwiching member sandwiches the first flange and the second flange in the first direction and is secured to at least one of the opening part side of the chamber and the opening part side of the fan.

In the water heating device, the first flow passage and the second flow passage extend in the first direction. Therefore, a mixed gas discharged from the fan is supplied into the chamber in the first direction. In the water heating device, the sandwiching member sandwiches the first flange and the second flange and is secured to at least one of the chamber and the fan on the opening part side of the housing. Therefore, an operator can easily connect the chamber and the fan to each other through the opening part of the housing.

In the water heating device, an outer peripheral surface of the first flange may be provided with a first convex portion. An outer peripheral surface of the second flange may be provided with a second convex portion. The first flange and the second flange may be in contact with each other so that the first convex portion and the second convex portion oppose each other. The sandwiching member may be provided with an insertion hole into which the first convex portion and the second convex portion are inserted.

In this case, since the circumferential rotation of the first flange with respect to the second flange is suppressed by inserting the first convex portion and the second convex portion into the insertion hole, the assemblability of the water heating device is improved.

In the water heating device, a width of the insertion hole in the first direction may become narrow as it goes away from base end portions of the first convex portion and the second convex portion.

In this case, the first convex portion and the second convex portion can be easily inserted into the insertion hole. Further, in this case, since the first convex portion and the second convex portion are pressed against each other in the first direction by the insertion hole after the first convex portion and the second convex portion are once inserted into the insertion hole, the adhesion between the first flange and the second flange can be improved.

In the water heating device, a positioning pin may be provided in an outer peripheral surface of the first flow passage to protrude from the outer peripheral surface of the first flow passage. The sandwiching member may be secured to the opening part side of the chamber. The sandwiching member may be provided with a positioning hole into which the positioning pin is inserted.

In this case, since the circumferential rotation of the first flange with respect to the second flange is suppressed by inserting the positioning pin into the positioning hole, the assemblability of the water heating device is improved.

In the water heating device, the sandwiching member may be secured to both the opening part side of the chamber and the opening part side of the fan.

In this case, since the circumferential rotation of the first flange with respect to the second flange is suppressed by securing the sandwiching member to both the chamber and the fan, the assemblability of the water heating device is improved.

The water heating device according to an aspect of the invention and the water heating device according to another aspect of the invention may further include a spark plug. The spark plug may be disposed on the opening part side in a planar view. The first flow passage and the second flow passage may be disposed on the opening part side in a planar view. In this case, since a mixed gas is easily supplied to the vicinity of the spark plug, the igniting performance of the burner can be improved.

Advantageous Effects of Invention

According to the water heating device of an aspect of the invention and the water heating device of another aspect of the invention, a mixed gas can be supplied into the chamber in a direction from the first side plate to the second side plate and the fan and the chamber can be easily connected to each other through the opening part provided in the housing.

DESCRIPTION OF THE EMBODIMENTS

Figure 1:
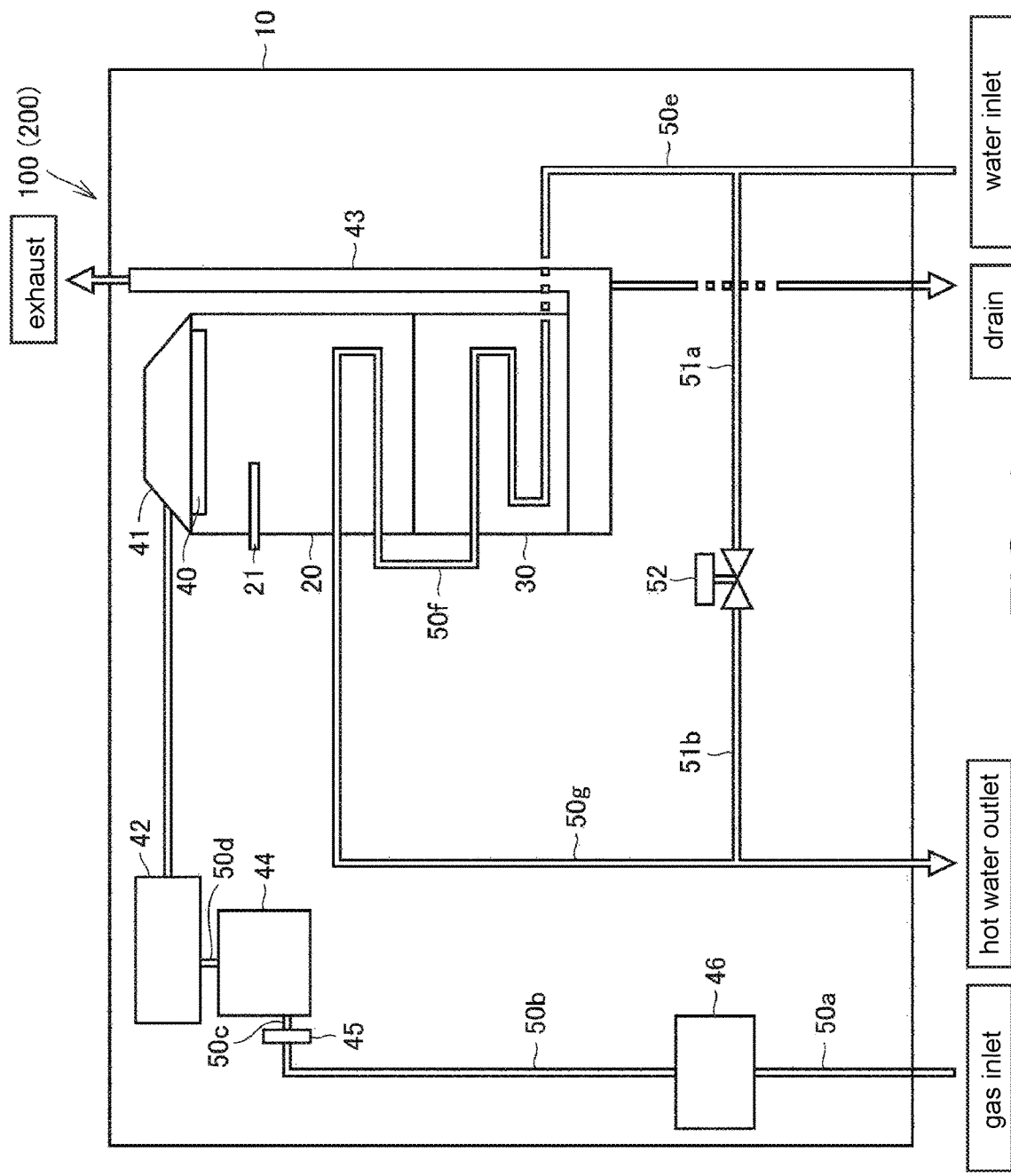
FIG. 1 is a schematic configuration diagram of a water heating device 100 according to an embodiment.

An embodiment of the invention will be described with reference to the drawings. In the drawings below, the same or corresponding parts will be denoted by the same reference numerals and redundant description will not be repeated.

(Configuration of Water Heating Device 100 of Embodiment)

Hereinafter, a configuration of a water heating device 100 according to the embodiment will be described.

<Schematic Configuration>

As shown in FIG. 1, the water heating device 100 includes a housing 10, a primary heat exchanger 20, a spark plug 21, a secondary heat exchanger 30, a burner 40, a chamber 41, a fan 42, a duct 43, a venturi 44, an orifice 45, a gas valve 46, pipes 50a to 50g, bypass pipes 51a and 51b, and a bypass servo 52.

The primary heat exchanger 20, the spark plug 21, the secondary heat exchanger 30, the burner 40, the chamber 41, the fan 42, the duct 43, the venturi 44, the orifice 45, the gas valve 46, the pipes 50a to 50g, the bypass pipes 51a and 51b, and the bypass servo 52 are disposed in the housing 10.

The burner 40 is disposed below the chamber 41. The primary heat exchanger 20 is disposed below the burner 40. The spark plug 21 is disposed below the burner 40. The spark plug 21 is attached to, for example, the primary heat exchanger 20. The secondary heat exchanger 30 is disposed below the primary heat exchanger 20.

A fuel gas is supplied from one end of the pipe 50a. The other end of the pipe 50a is connected to the gas valve 46. One end of the pipe 50b is connected to the gas valve 46. The other end of the pipe 50b is connected to the orifice 45. One end of the pipe 50c is connected to the orifice 45. The other end of the pipe 50c is connected to the venturi 44.

One end of the pipe 50d is connected to the venturi 44. The other end of the pipe 50d is connected to the fan 42. The fan 42 is connected to the chamber 41. This point will be described below. The chamber 41 is connected to the burner 40.

Water is supplied from one end of the pipe 50e. The other end of the pipe 50e is connected to the secondary heat exchanger 30. One end of the pipe 50f is connected to the secondary heat exchanger 30. The other end of the pipe 50f is connected to the primary heat exchanger 20. One end of the pipe 50g is connected to the primary heat exchanger 20. Hot water is discharged from the other end of the pipe 50g.

One end of the bypass pipe 51a is connected to the pipe 50e. The other end of the bypass pipe 51a is connected to the bypass servo 52. One end of the bypass pipe 51b is connected to the bypass servo 52. The other end of the bypass pipe 51b is connected to the pipe 50g.

The gas valve 46 supplies the fuel gas from the pipe 50a or stops the supply thereof. Accordingly, the pressure of the fuel gas supplied to the venturi 44 is adjusted.

The venturi 44 is configured to take in air from the outside of the housing 10. The venturi 44 mixes air taken in from the outside of the housing 10 with the fuel gas supplied to the venturi 44 through the pipe 50a, the pipe 50b, the pipe 50c, the orifice 45, and the gas valve 46 (hereinafter, the fuel gas mixed with air will be referred to as a mixed gas).

The fan 42 includes a fan housing 42a (see FIG. 3), an impeller 42b (not shown) disposed in the fan housing, and a motor 42c (see FIG. 3) which rotationally drives the impeller. The fan 42 sucks the mixed gas generated by the venturi 44 through the pipe 50c in such a manner that the motor 42c rotationally drives the impeller 42b. The sucked mixed gas is supplied to the burner 40 through the chamber 41.

The mixed gas is ejected downward from a flame hole provided in the lower surface of the burner 40. The ejected mixed gas is ignited by the spark plug 21 to be burned and becomes a combustion gas. The combustion gas is ejected downward (that is, toward the primary heat exchanger 20).

The temperature of the water supplied to the secondary heat exchanger 30 through the pipe 50e increases by exchanging heat with the latent heat of the combustion gas in the secondary heat exchanger 30. The water having passed through the secondary heat exchanger 30 is supplied to the primary heat exchanger 20 through the pipe 50f. The temperature of the water supplied to the primary heat exchanger 20 further increases by exchanging heat with the sensible heat of the combustion gas in the primary heat exchanger 20. The water having passed through the primary heat exchanger 20 flows through the pipe 50g.

A part of the water flowing through the pipe 50e flows to the bypass pipe 51a. The flow rate of the water flowing from the bypass pipe 51a to the bypass pipe 51b is controlled by the bypass servo 52. The water flowing through the bypass pipe 51b is mixed with the water flowing through the pipe 50g. That is, the temperature of the water discharged from the other end of the pipe 50g is adjusted in such a manner that the bypass servo 52 controls the flow rate of the water flowing from the bypass pipe 51a to the bypass pipe 51b.

Water generated when water vapor in the combustion gas is condensed in the primary heat exchanger 20 (hereinafter, this water will be referred to as drain) passes through the duct 43 and is discharged to the outside of the housing 10.

<Specific Configuration of Housing>

Figure 2:
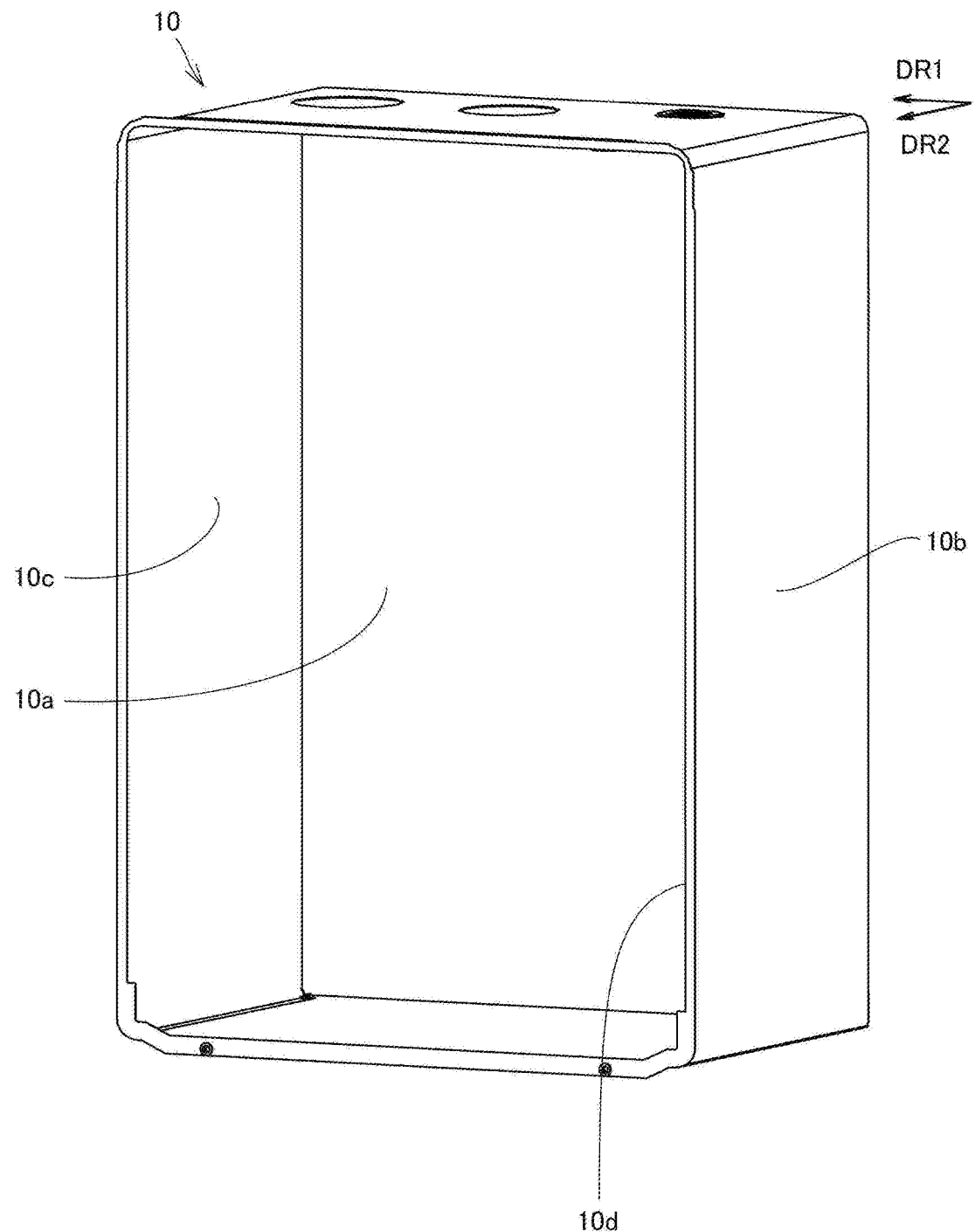
FIG. 2 is a perspective view of a housing 10 of the water heating device 100 according to the embodiment.

As shown in FIG. 2, the housing 10 includes a back plate 10a, a side plate 10b (a first side plate), a side plate 10c (a second side plate), and an opening part 10d. The side plate 10b and the side plate 10c oppose each other in a first direction DR1. The side plate 10b and the side plate 10c extend from both side ends of the back plate 10a in a second direction DR2 intersecting the first direction DR1. The opening part 10d is provided on the side opposite to the back plate 10a in the second direction.

Additionally, although not shown in FIG. 2, the housing 10 further includes a front plate which is attached to cover the opening part 10d. Further, the second direction DR2 is preferably orthogonal to the first direction DR1.

<Configuration of Fan>

Figure 3:
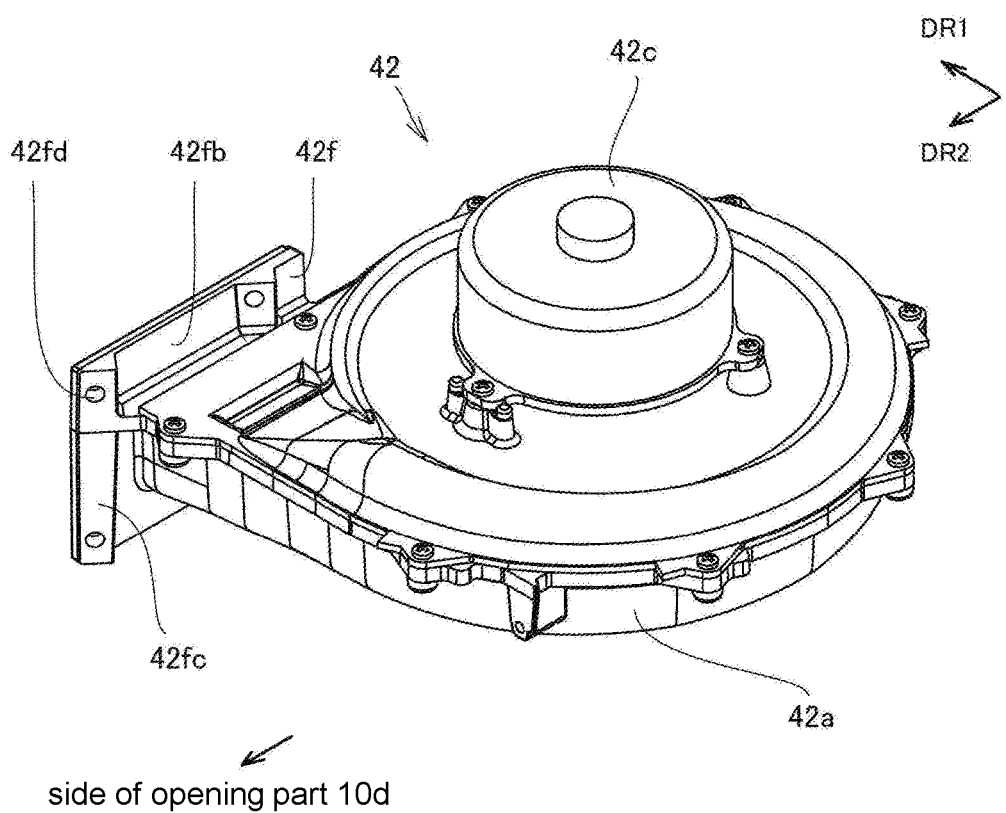
FIG. 3 is a perspective view of a fan 42 of the water heating device 100 according to the embodiment.
Figure 4:
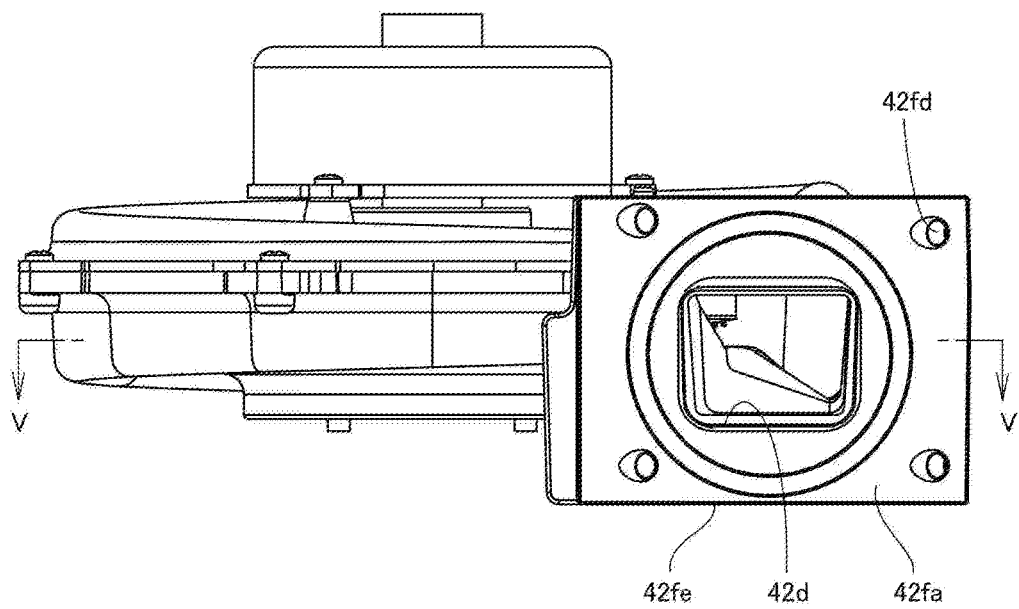
FIG. 4 is a side view of the fan 42 of the water heating device 100 according to the embodiment.
Figure 5:
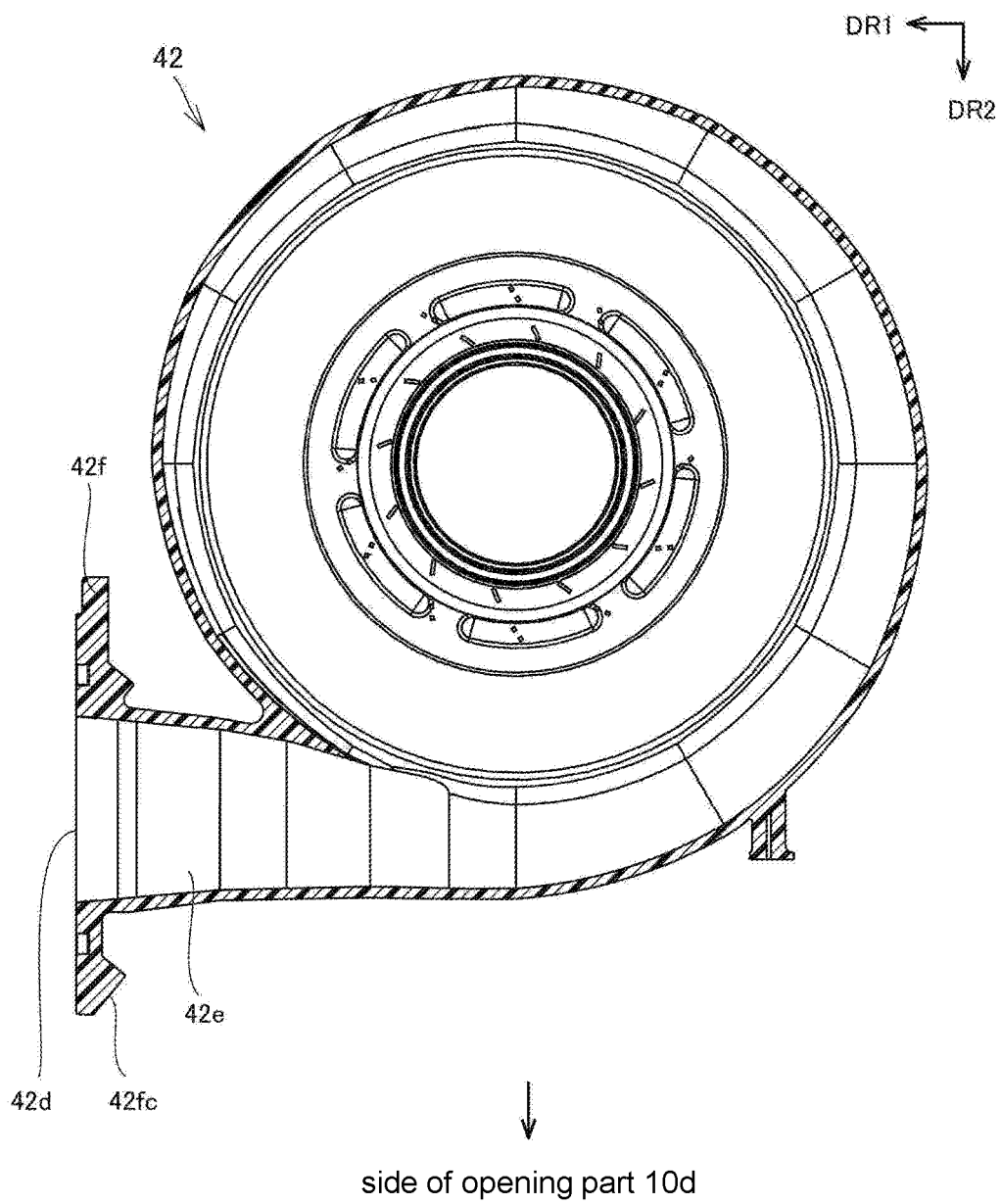
FIG. 5 is a cross-sectional view of V-V of FIG. 4.
Figure 6:
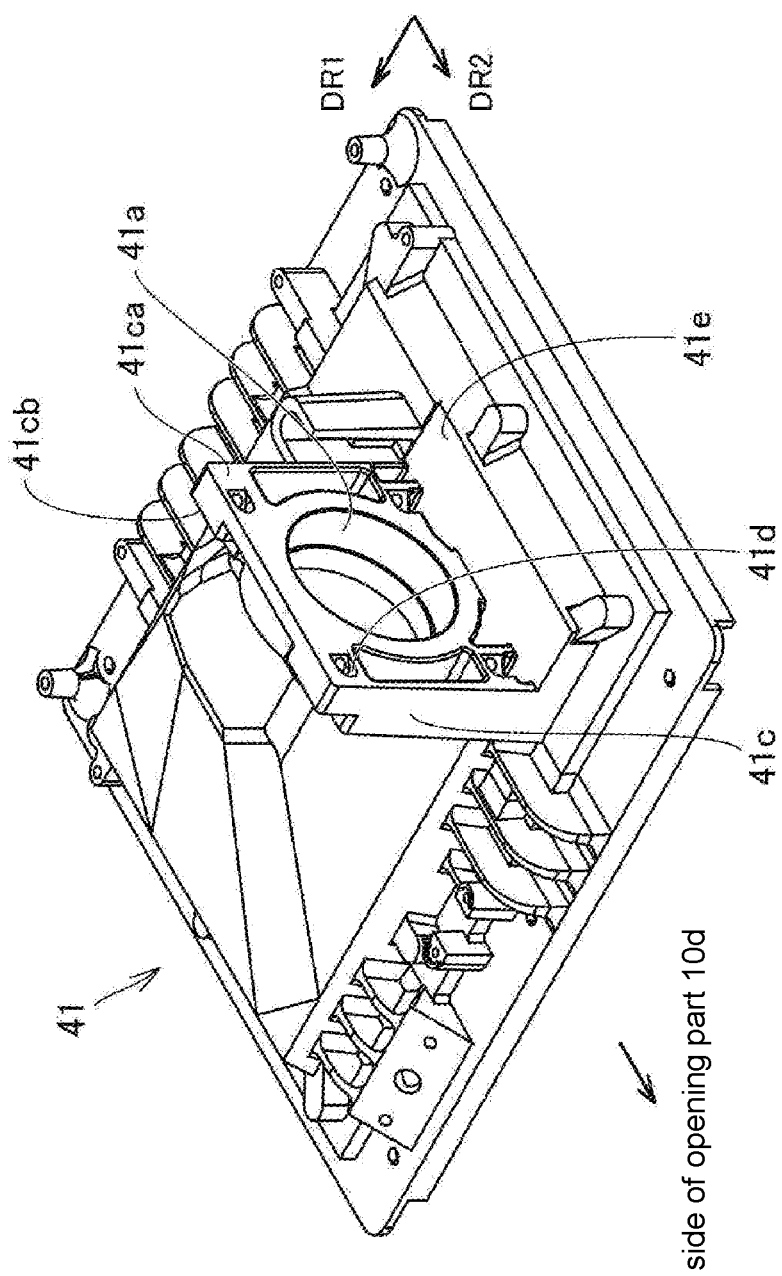
FIG. 6 is a perspective view of a chamber 41 of the water heating device 100 according to the embodiment.
Figure 7:
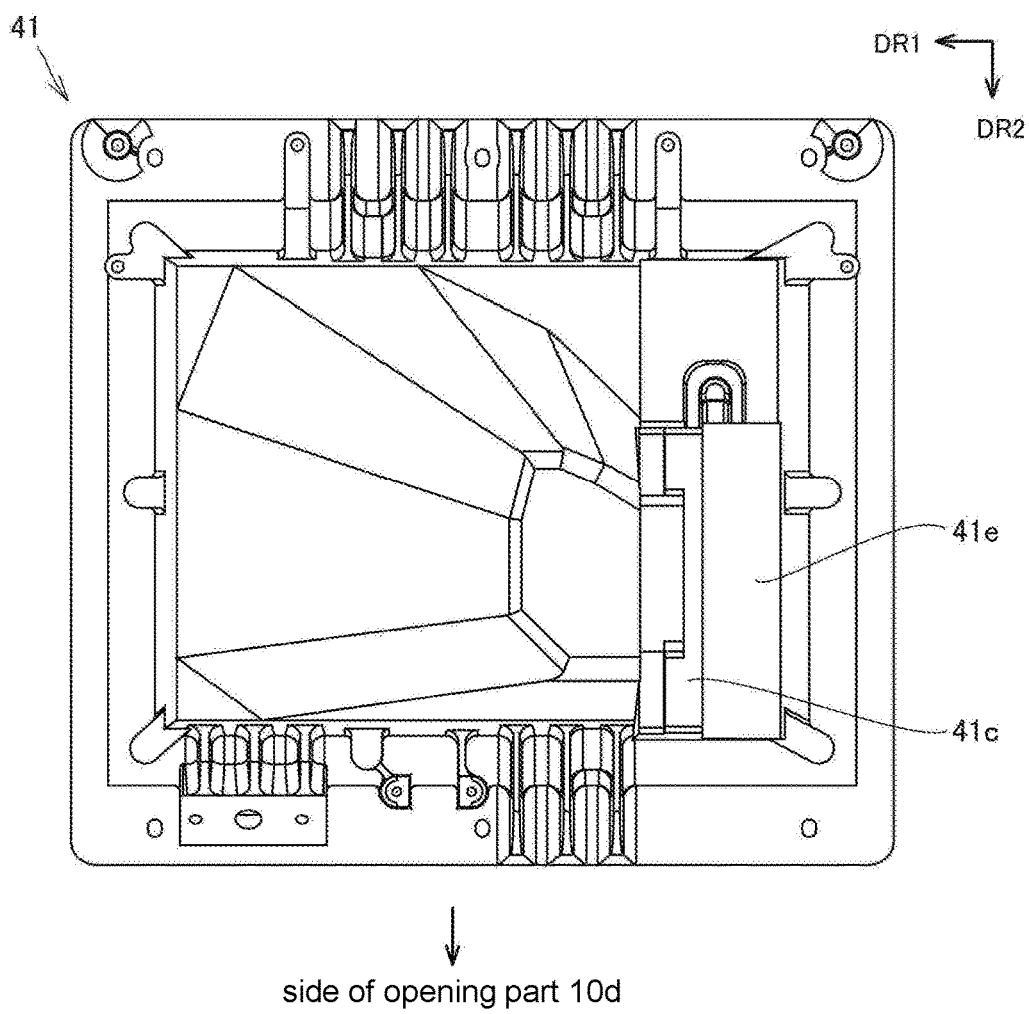
FIG. 7 is a top view of the chamber 41 of the water heating device 100 according to the embodiment.
Figure 8:
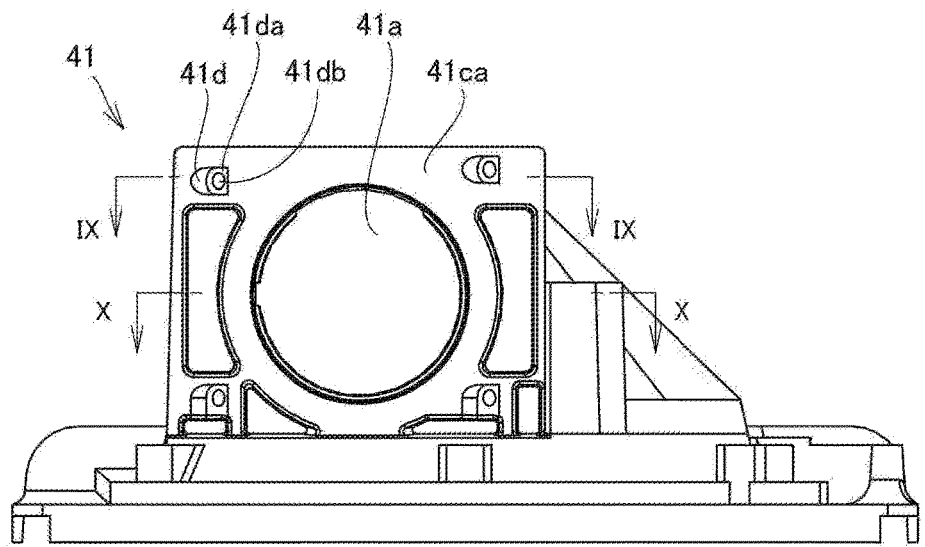
FIG. 8 is a side view of the chamber 41 of the water heating device 100 according to the embodiment.
Figure 9:
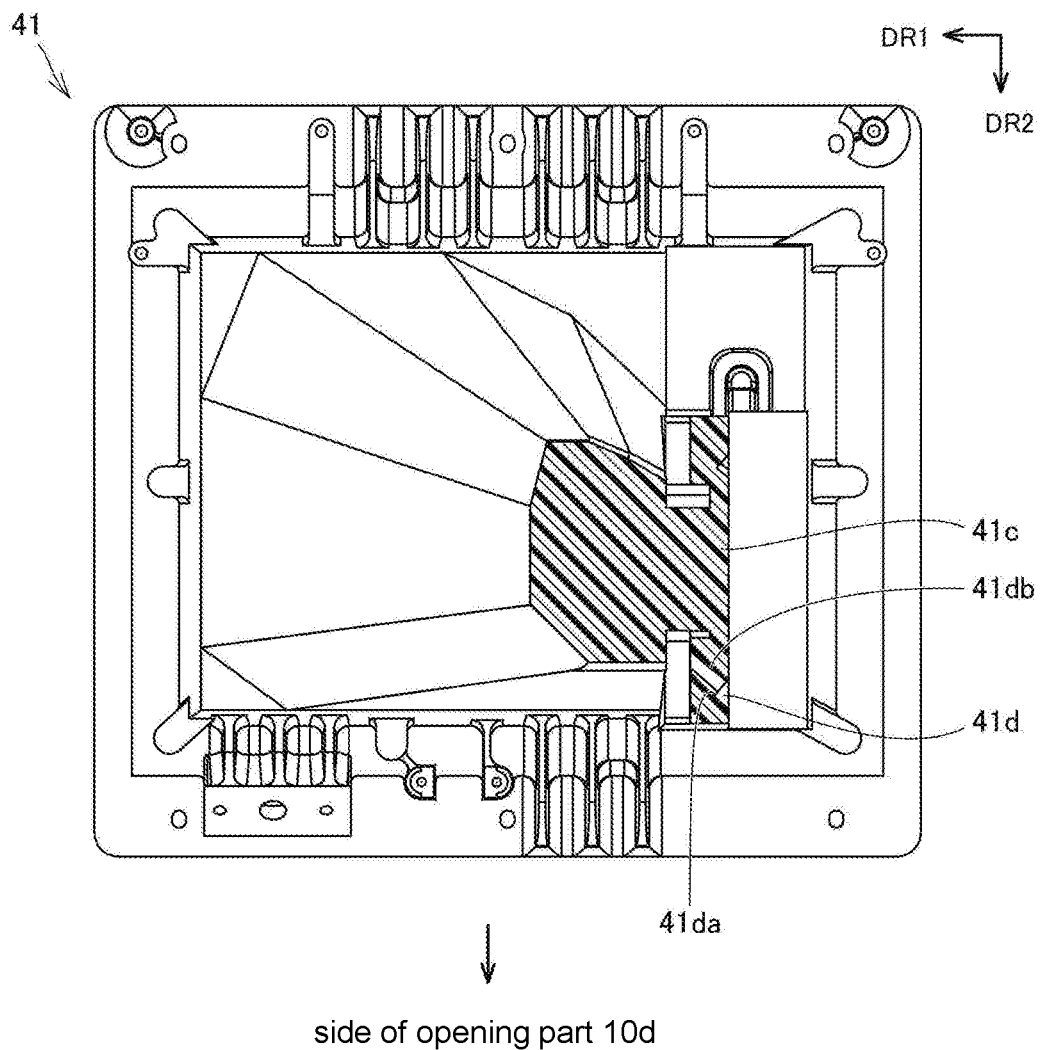
FIG. 9 is a cross-sectional view of IX-IX of FIG. 8.
Figure 10:
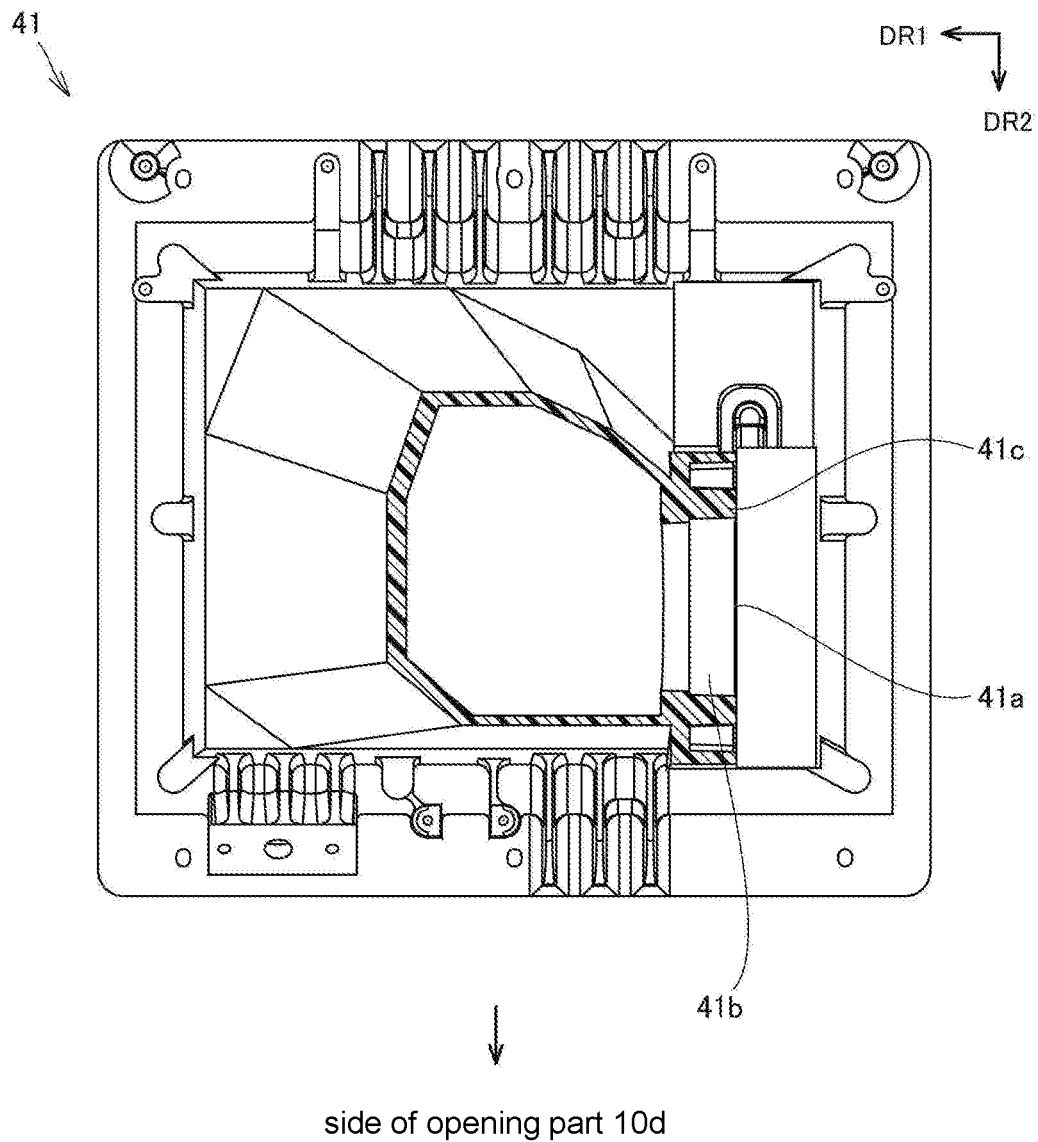
FIG. 10 is a cross-sectional view of X-X of FIG. 8.
Figure 11:
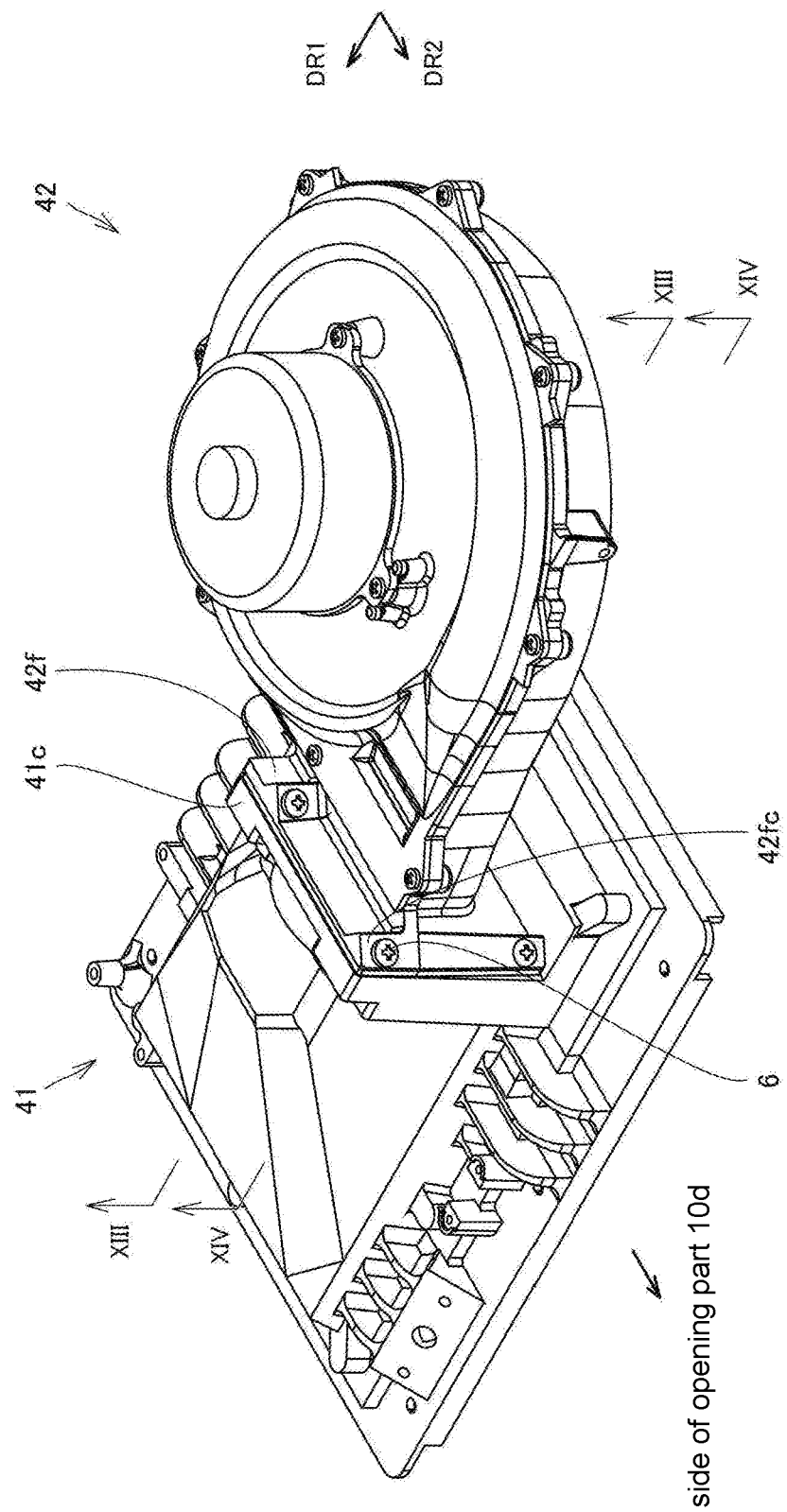
FIG. 11 is a perspective view of the chamber 41 and the fan 42 of the water heating device 100 according to the embodiment.
Figure 12:
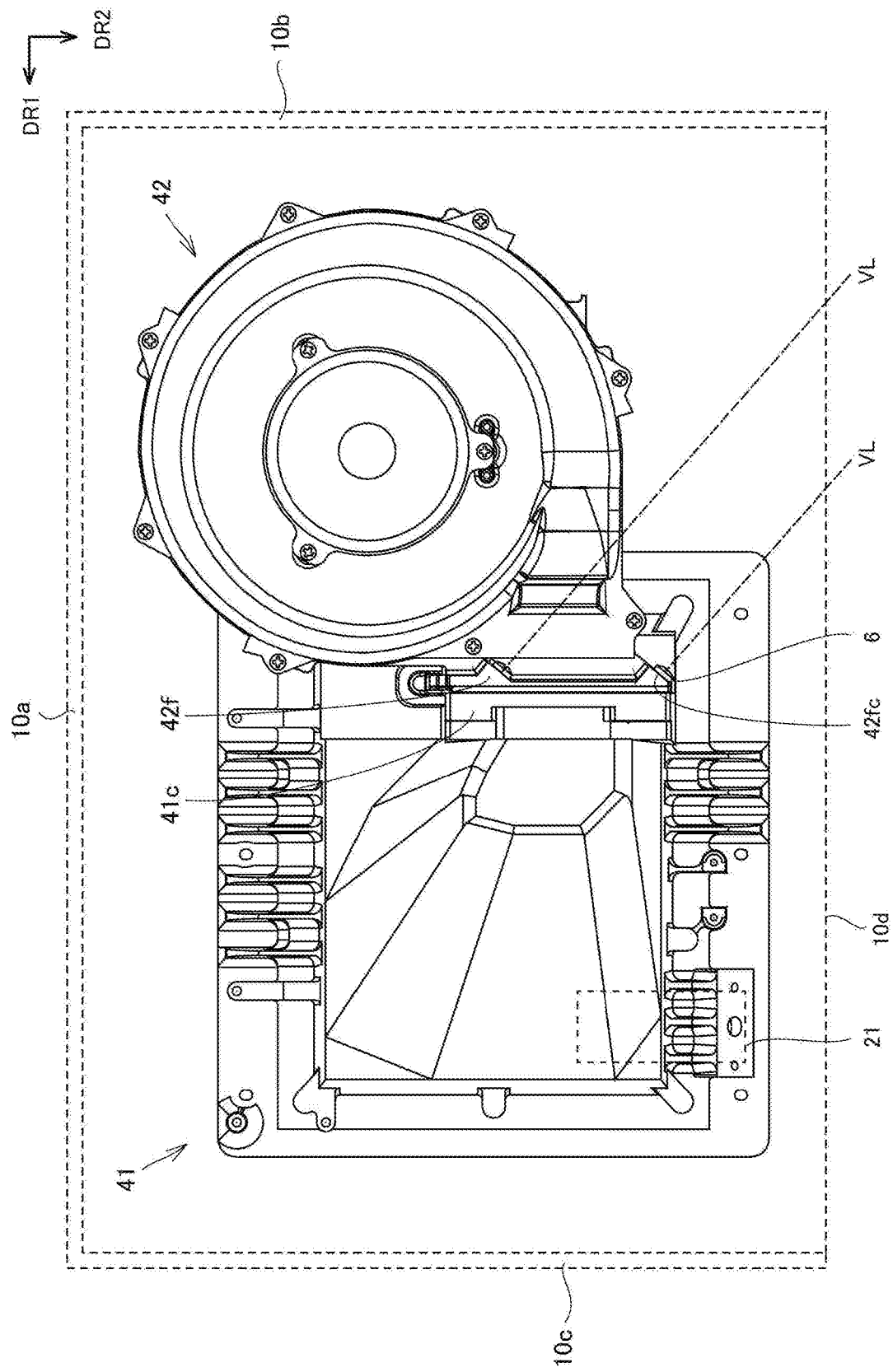
FIG. 12 is a top view of the chamber 41 and the fan 42 of the water heating device 100 according to the embodiment.
Figure 13:
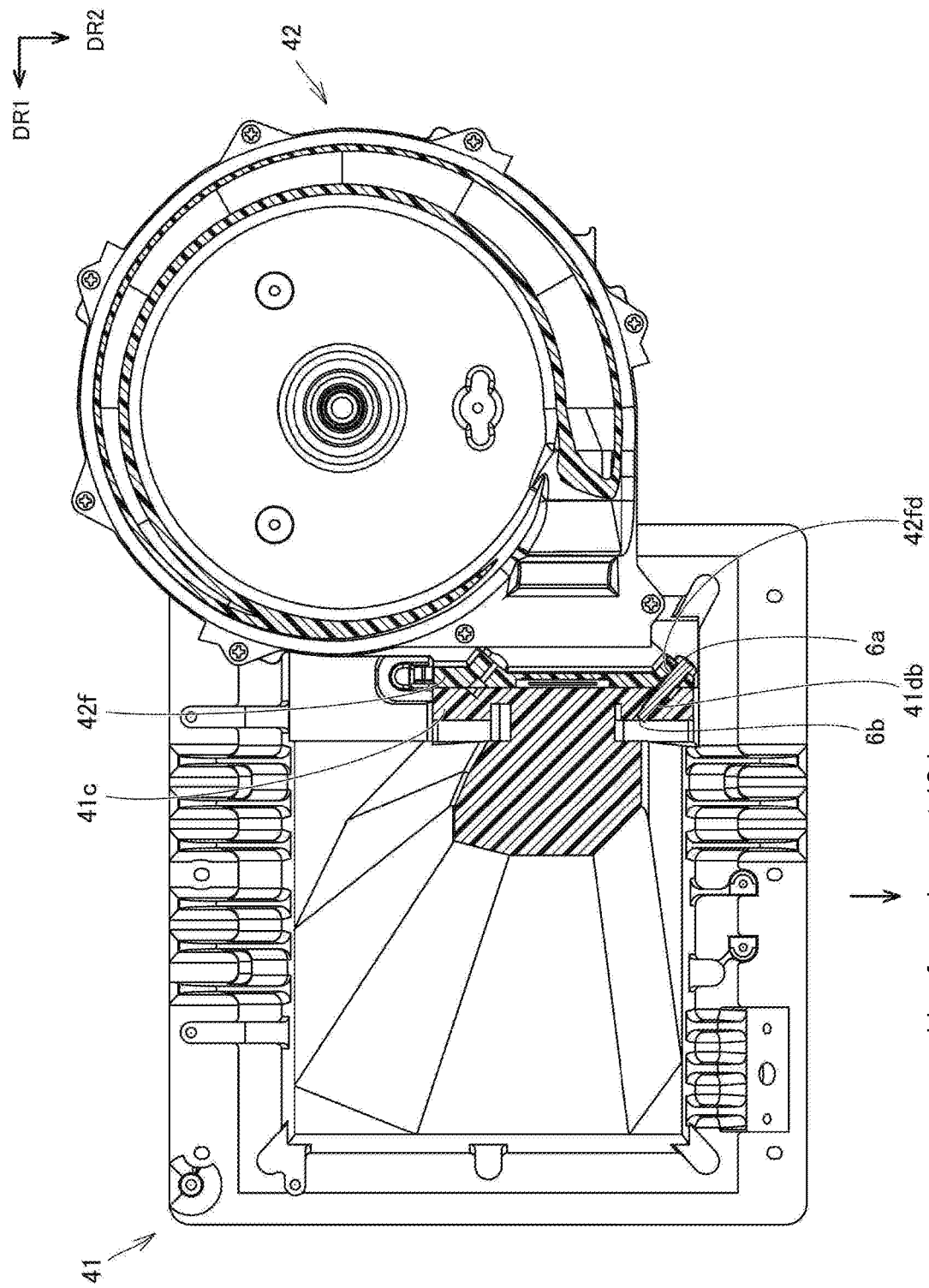
FIG. 13 is a cross-sectional view of XIII-XIII of FIG. 11.
Figure 14:
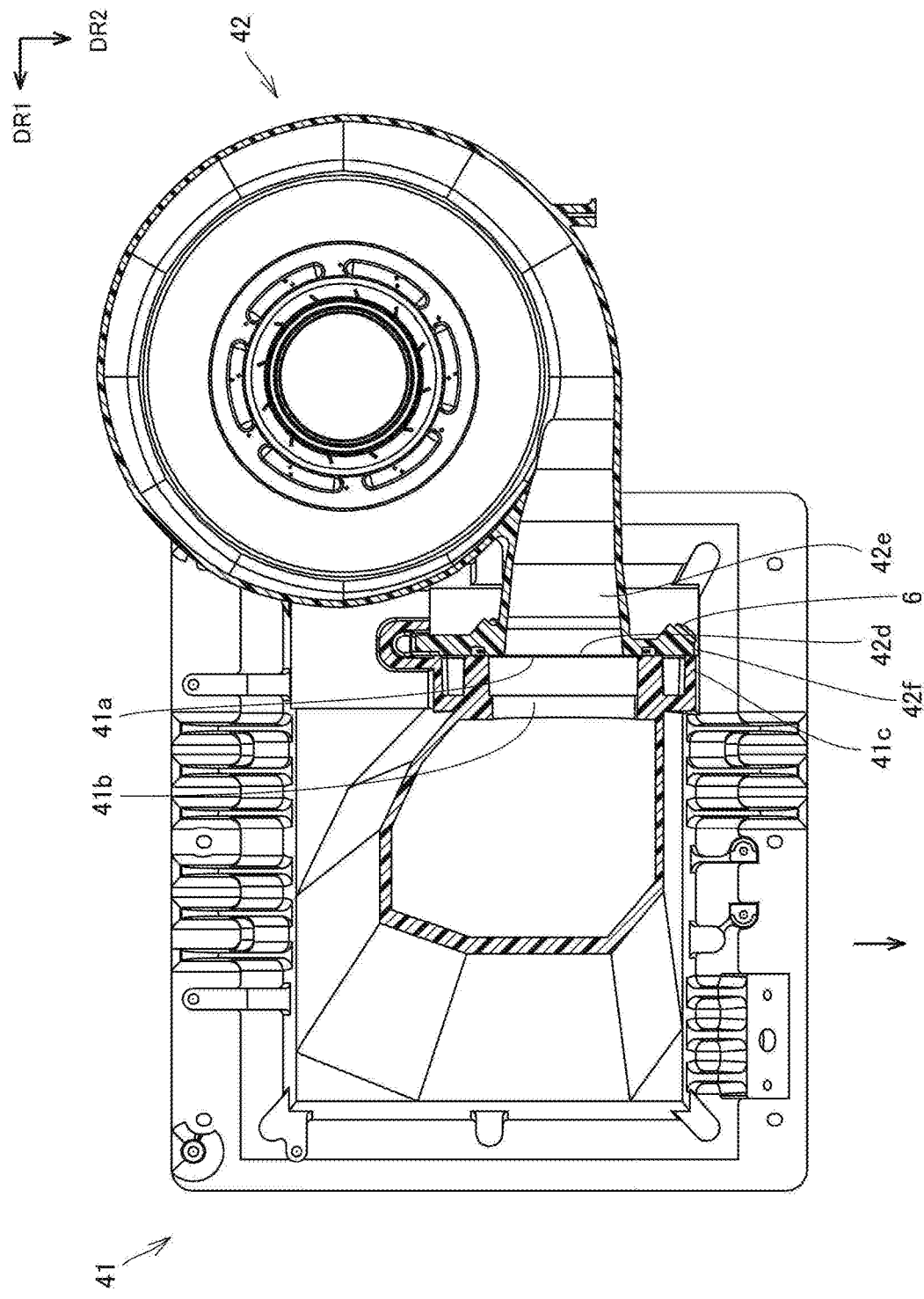
FIG. 14 is a cross-sectional view of XIV-XIV of FIG. 11.

As shown in FIGS. 3 to 5, the fan 42 includes a discharge opening 42d, a flow passage 42e (a first flow passage), and a flange 42f (a first flange). The discharge opening 42d, the flow passage 42e, and the flange 42f are provided in the fan housing 42a.

The flow passage 42e extends toward the discharge opening 42d. The flow passage 42e extends in the first direction DR1. Additionally, it is considered that the "flow passage 42e extends in the first direction DR1" if an angle formed by the extension direction of the flow passage 42e and the first direction DR1 is in the range of 0±5° even when the extension direction of the flow passage 42e is not completely parallel to the first direction DR1. The mixed gas sucked by the fan 42 passes through the flow passage 42e and is discharged from the discharge opening 42d.

The flange 42f is provided in the discharge opening 42d. The flange 42f is provided to project from the outer peripheral surface of the flow passage 42e.

The flange 42f projects from the outer peripheral surface of the flow passage 42e, for example, in a plane orthogonal to the first direction DR1. From another viewpoint, the flange 42f is parallel to the side plate 10b and the side plate 10c. The flange 42f has a rectangular shape.

The flange 42f includes a first surface 42fa and a second surface 42fb. The first surface 42fa is a surface which is in contact with a flange 41c to be described later. The second surface 42fb is a surface on the side opposite to the first surface 42fa.

The second surface 42fb includes a seat surface portion 42fc. The seat surface portion 42fc is provided with a through-hole 42fd. The through-hole 42fd reaches the first surface 42fa. A screw 6 to be described later is inserted through the through-hole 42fd. The seat surface portion 42fc is slanted to intersect the center axis of the screw 6 in a planar view. The outer peripheral surface of the flange 42f includes a flat surface portion 42fe (a first flat surface portion). The flat surface portion 42fe is formed as a flat surface. The flat surface portion 42fe is located below the discharge opening 42d.

<Configuration of Chamber>

As shown in FIGS. 6 to 10, the chamber 41 includes an intake opening 41a, a flow passage 41b (a second flow passage), a flange 41c (a second flange), a concave portion 41d, and a flat surface portion 41e (a second flat surface portion).

The mixed gas is sucked from the intake opening 41a. The flow passage 41b extends from the intake opening 41a. The flow passage 41b extends in the first direction DR1. Additionally, it is considered that the "flow passage 41b extends in the first direction DR1" if an angle formed by the extension direction of the flow passage 41b and the first direction DR1 is in the range of 0±5° even when the extension direction of the flow passage 41b is not completely parallel to the first direction DR1. The mixed gas sucked from the intake opening 41a is supplied into the chamber 41 through the flow passage 41b.

The flange 41c projects from the outer peripheral surface of the flow passage 41b, for example, in a plane orthogonal to the first direction DR1. From another viewpoint, the flange 41c is parallel to the side plate 10b and the side plate 10c. The flange 41c has a rectangular shape.

The flange 41c includes a third surface 41ca and a fourth surface 41cb. The third surface 41ca is a surface which is in contact with the flange 42f. The fourth surface 41cb is a surface on the side opposite to the third surface 41ca.

The third surface 41ca includes the concave portion 41d. The third surface 41ca is recessed in the concave portion 41d. The concave portion 41d includes a bottom surface 41da. The bottom surface 41da is provided with a screw hole 41db. The screw 6 to be described later is threaded into the screw hole 41db. The bottom surface 41da is slanted to intersect a direction along the center axis of the screw 6 to be described later. It is preferable that the screw hole 41db penetrate the flange 41c. The screw hole 41db is formed by using a tool such as a tap.

The flat surface portion 41e is in contact with the flat surface portion 42fe while the chamber 41 and the fan 42 are connected to each other (the flange 41c and the flange 42f are in contact with each other). The flat surface portion 41e is formed as a flat surface.

<Connection of Fan and Chamber>

As shown in FIGS. 11 to 14, the chamber 41 and the fan 42 are connected to each other. More specifically, the flange 41c and the flange 42f are in contact with each other so that the intake opening 41a and the discharge opening 42d communicate with each other.

The screw 6 includes a head portion 6a and a tip-end portion 6b. The head portion 6a is located at one end of the screw 6 in a direction along the center axis thereof. The tip-end portion 6b is located at the other end of the screw 6 in the direction along the center axis. That is, the tip-end portion 6b is located on the side opposite to the head portion 6a in the direction along the center axis of the screw 6.

The flange 41c and the flange 42f are secured to each other in such a manner that the screw 6 is inserted through the through-hole 42fd and is threaded into the screw hole 41db so that the head portion 6a is in contact with the seat surface portion 42fc. Accordingly, the chamber 41 and the fan 42 are in contact with each other. The center axis of the screw 6 is slanted so that the side of the head portion 6a is closer to the opening part 10d than the tip-end portion 6b in a planar view. More specifically, the center axis of the screw 6 is slanted so that a virtual line VL formed by extending the center axis of the screw 6 passes through the opening part 10d. Additionally, all screws 6 satisfy that the "center axis of the screw 6 is slanted so that the virtual line VL formed by extending the center axis of the screw 6 passes through the opening part 10d".

In a planar view, the spark plug 21 is located on the side of the opening part 10d in the chamber 41. A "case in which the spark plug 21 is located on the side of the opening part 10d in the chamber 41 in a planar view" means that the spark plug 21 is located closer to the opening part 10d than the center of the chamber 41 in the second direction DR2 in a planar view.

The fan 42 is disposed on the side of the side plate 10b in the housing 10. The chamber 41 is disposed on the side of the side plate 10c in the housing 10.

The flow passage 41b and the flow passage 42e are located on the side of the opening part 10d in the chamber 41 in a planar view. Additionally, a "case in which the flow passage 41b and the flow passage 42e are located on the side of the opening part 10d in the chamber 41 in a planar view" means that the flow passage 41b and the flow passage 42e are located closer to the opening part 10d than the center of the chamber 41 in the second direction DR2 in a planar view.

(Effect of Water Heating Device 100 of Embodiment)

Hereinafter, an effect of the water heating device 100 of the embodiment will be described.

<Basic Effect>

In the water heating device 100, the flow passage 41b and the flow passage 42e extend in the first direction DR1. Therefore, the mixed gas discharged from the fan 42 is sucked into the chamber 41 in the first direction DR1.

In the water heating device 100, the flange 41c and 42f are secured by the screw 6, but the screw 6 is slanted so that the side of the head portion 6a is closer to the opening part 10d than the side of the tip-end portion 6b in a planar view. Therefore, an operator can easily rotate the screw 6 through the opening part 10d of the housing 10 by using a tool such as a driver.

In this way, according to the water heating device 100, the mixed gas can be supplied into the chamber 41 in the first direction DR1 and the chamber 41 and the fan 42 can be easily connected to each other through the opening part 10d provided in the housing 10.

<Auxiliary Effect>

Since the flow passage 41b and the flow passage 42e are located on the side of the opening part 10d in the chamber 41 and the spark plug 21 is located on the side of the opening part 10d in the chamber 41, the mixed gas is easily supplied to the vicinity of the spark plug 21 and the igniting performance of the burner 40 can be improved.

In the water heating device 100, when the center axis of the screw 6 is slanted so that the virtual line VL formed by extending the center axis of the screw 6 passes through the opening part 10d, an operator can more easily rotate the screw 6.

In the water heating device 100, when the flange 42f includes the flat surface portion 42fe and the chamber 41 includes the flat surface portion 41e, the relative rotation of the fan 42 with respect to the chamber 41 about the rotation axis along the first direction DR1 is suppressed due to the contact between the flat surface portion 41e and the flat surface portion 42fe.

In the water heating device 100, when the third surface 41ca includes the concave portion 41d and the bottom surface 41da is provided with the screw hole 41db, a tool for forming the screw hole 41db such as a tap does not easily deviate from a position where the screw hole 41db is to be formed and hence the screw hole 41db can be formed with high accuracy.

In the water heating device 100, when the screw hole 41db penetrates the flange 41c, chips generated when forming the screw hole 41db can be easily discharged from the screw hole 41db.

(Configuration of Water Heating Device 200 of Embodiment)

Hereinafter, a configuration of a water heating device 200 according to the embodiment will be described.

<Schematic Configuration>

The water heating device 200 includes a housing 10, a primary heat exchanger 20, a spark plug 21, a secondary heat exchanger 30, a burner 40, a chamber 41, a fan 42, a duct 43, a venturi 44, an orifice 45, a gas valve 46, pipes 50a to 50g, bypass pipes 51a and 51b, and a bypass servo 52. Additionally, since the schematic configuration and the connection relationship of the housing 10, the primary heat exchanger 20, the spark plug 21, the secondary heat exchanger 30, the burner 40, the chamber 41, the fan 42, the duct 43, the venturi 44, the orifice 45, the gas valve 46, the pipes 50a to 50g, the bypass pipes 51a and 51b, and the bypass servo 52 in the water heating device 200 are common to the water heating device 100, the description thereof will be omitted herein. Hereinafter, the specific configuration of the chamber 41 and the fan 42 of the water heating device 200 will be mainly described.

<Configuration of Fan>

Figure 15:
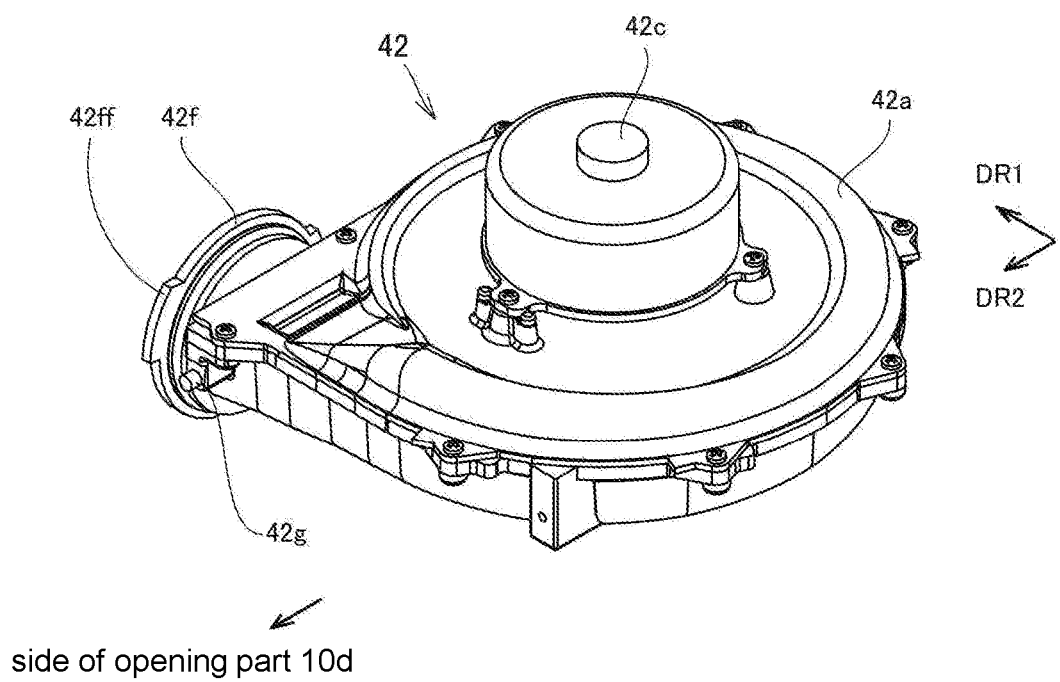
FIG. 15 is a perspective view of a fan 42 of a water heating device 200 according to an embodiment.
Figure 16:
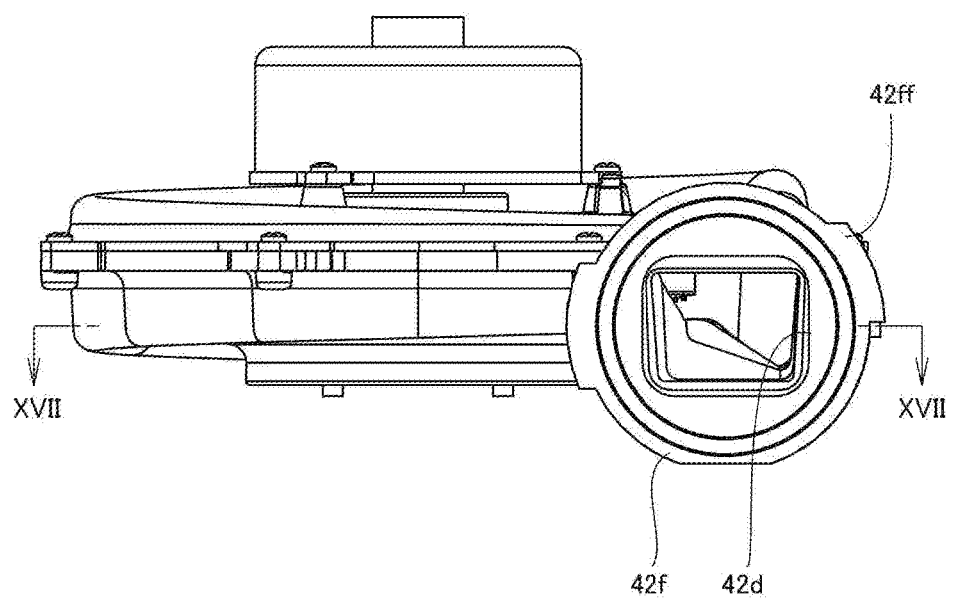
FIG. 16 is a side view of the fan 42 of the water heating device 200 according to the embodiment.
Figure 17:
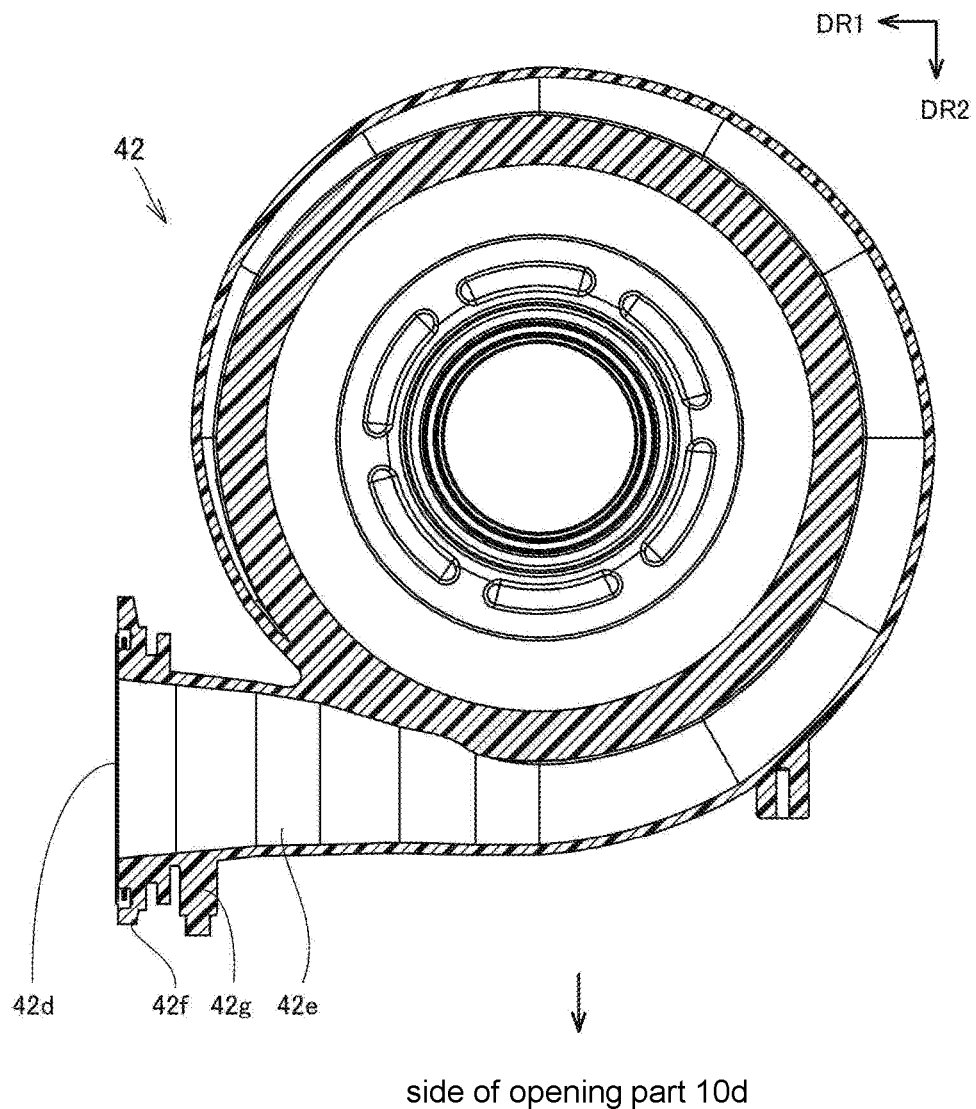
FIG. 17 is a cross-sectional view of XVII-XVII of FIG. 16.

As shown in FIGS. 15 to 17, the fan 42 includes a discharge opening 42d, a flow passage 42e (a first flow passage), a flange 42f (a first flange), and a positioning pin 42g. The discharge opening 42d, the flow passage 42e, the flange 42f, and the positioning pin 42g are provided in a fan housing 42a.

The flow passage 42e extends toward the discharge opening 42d. The flow passage 42e extends in a first direction DR1. Additionally, it is considered that the "flow passage 42e extends in the first direction DR1" if an angle formed by the extension direction of the flow passage 42e and the first direction DR1 is in the range of 0±5° even when the extension direction of the flow passage 42e is not completely parallel to the first direction DR1. The mixed gas sucked by the fan 42 passes through the flow passage 42e and is discharged from the discharge opening 42d.

The flange 42f is provided in the discharge opening 42d. The flange 42f is provided to project from the outer peripheral surface of the flow passage 42e.

The flange 42f projects from the outer peripheral surface of the flow passage 42e, for example, in a plane orthogonal to the first direction DR1. From another viewpoint, the flange 42f is parallel to the side plate 10b and the side plate 10c.

The outer peripheral surface of the flange 42f is provided with a convex portion 42ff (a first convex portion). The convex portion 42ff protrudes from the outer peripheral surface of the flange 42f in the radial direction of the flange 42f. The positioning pin 42g is provided in the outer peripheral surface of the flow passage 42e. The positioning pin 42g protrudes from the outer peripheral surface of the flow passage 42e. The positioning pin 42g is provided on the side of the opening part 10d in the fan 42.

<Configuration of Chamber>

Figure 18:
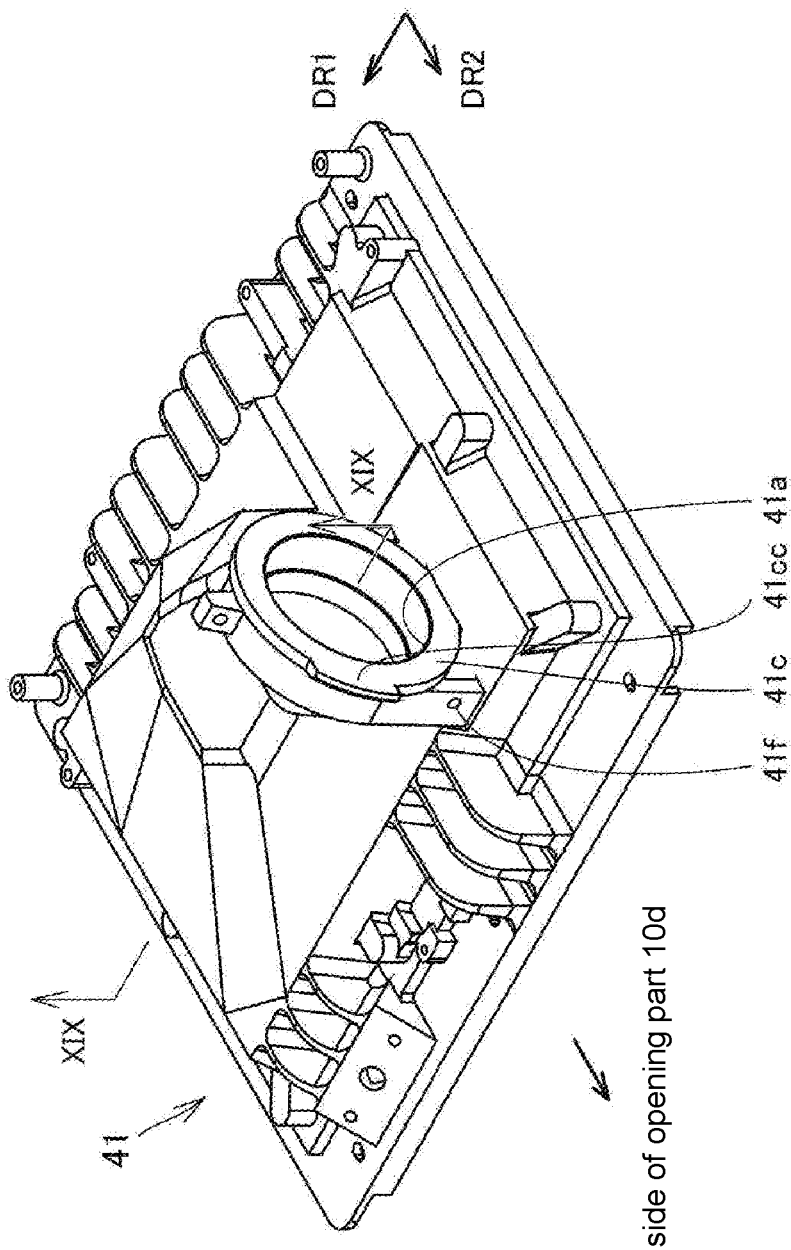
FIG. 18 is a perspective view of a chamber 41 of the water heating device 200 according to the embodiment.
Figure 19:
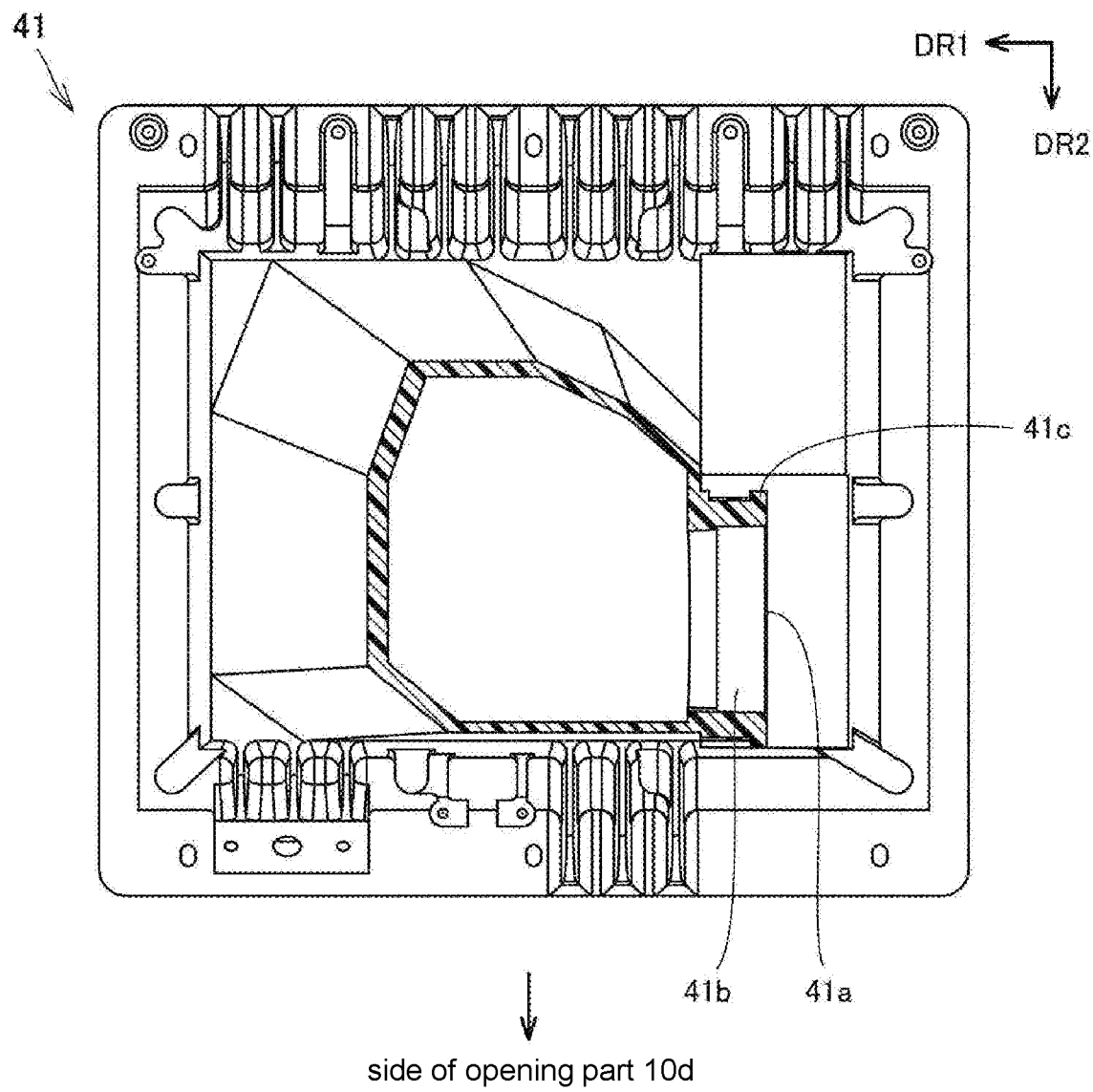
FIG. 19 is a cross-sectional view of XIX-XIX of FIG. 18.
Figure 20:
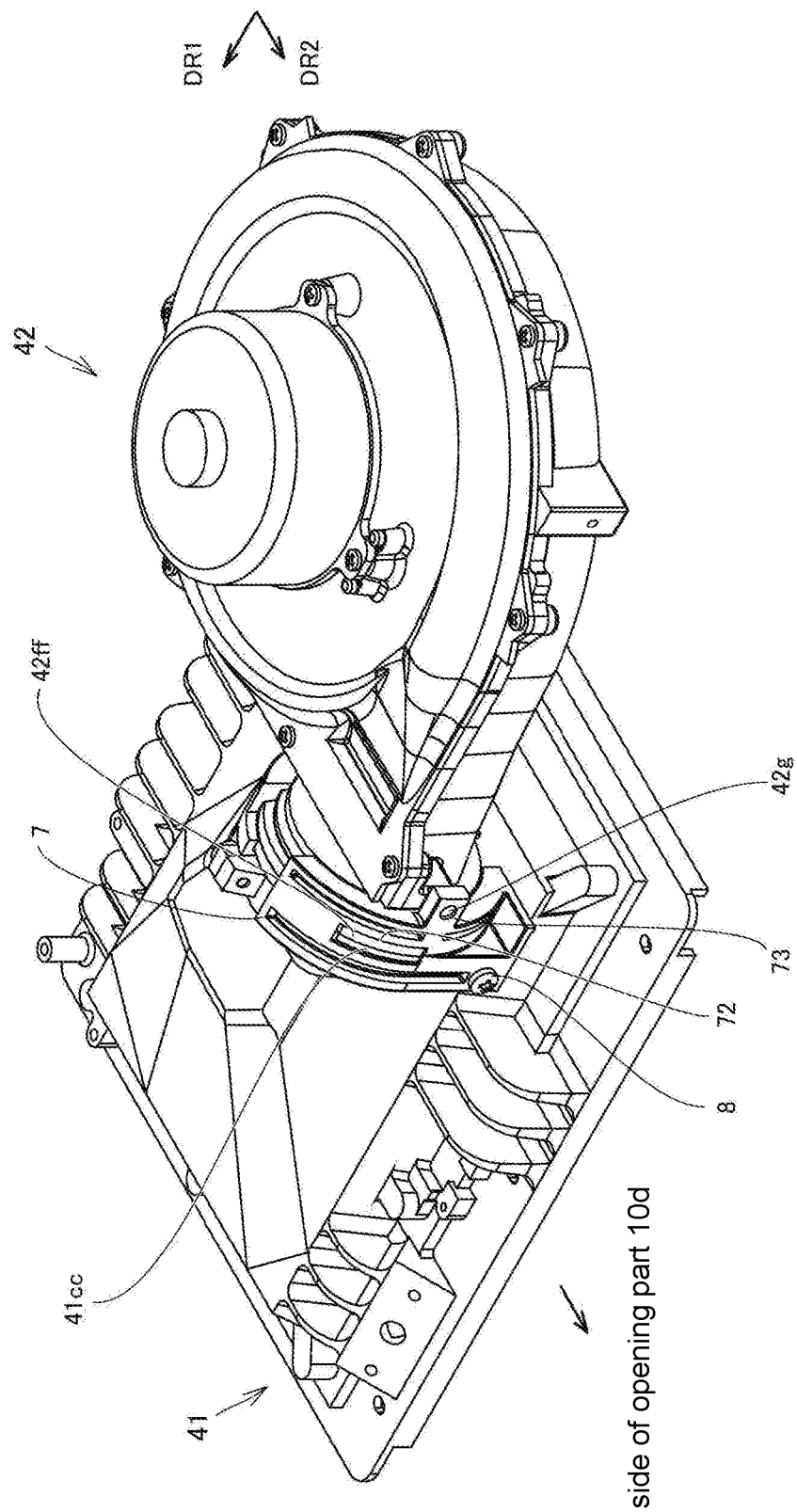
FIG. 20 is a perspective view of the chamber 41 and the fan 42 of the water heating device 200 according to the embodiment.
Figure 21:
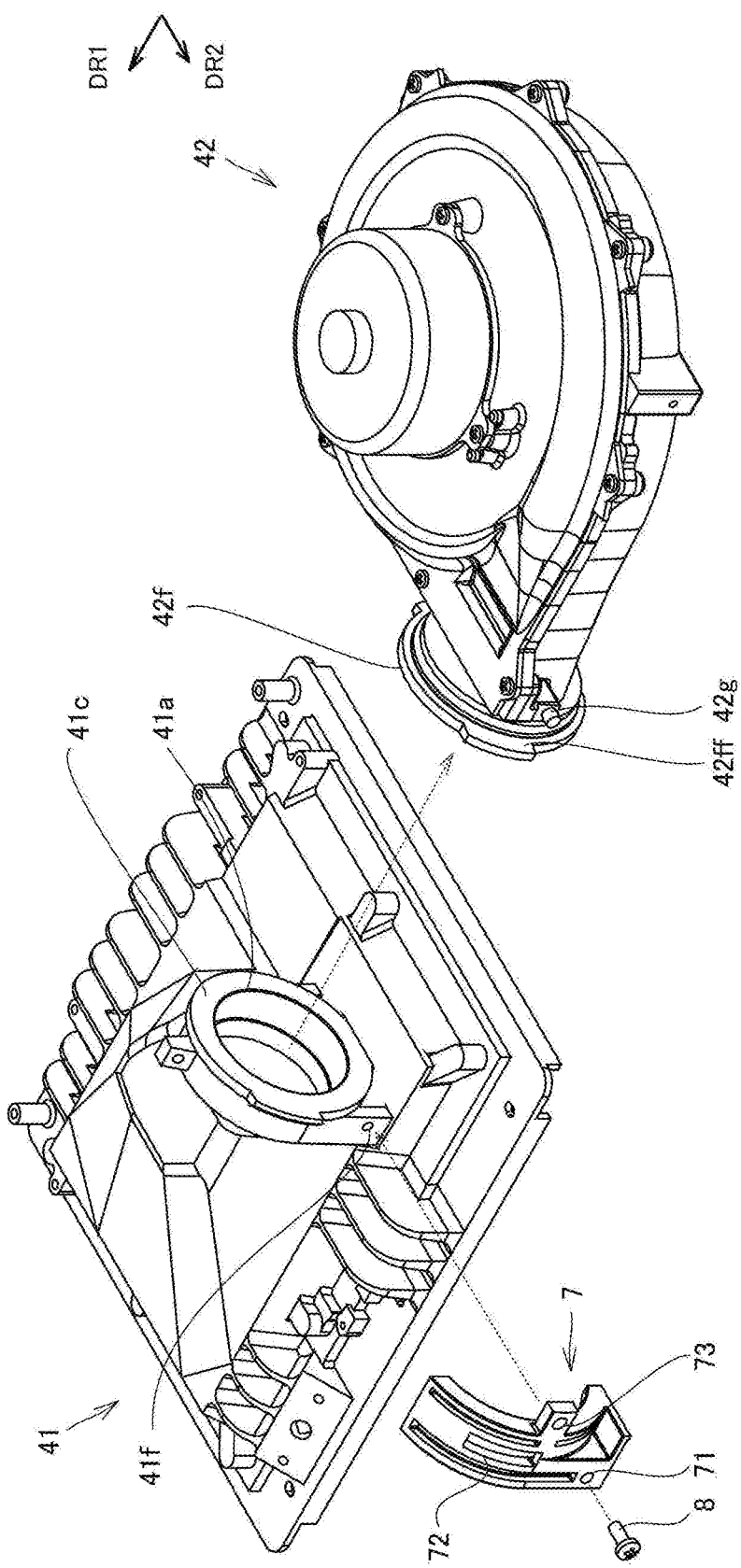
FIG. 21 is an exploded perspective view of the chamber 41 and the fan 42 of the water heating device 200 according to the embodiment.

As shown in FIGS. 18 and 19, the chamber 41 includes an intake opening 41a, a flow passage 41b (a second flow passage), a flange 41c (a second flange), and a screw hole 41f.

The mixed gas is sucked from the intake opening 41a. The flow passage 41b extends from the intake opening 41a. The flow passage 41b extends in the first direction DR1. Additionally, it is considered that the "flow passage 41b extends in the first direction DR1" if an angle formed by the extension direction of the flow passage 41b and the first direction DR1 is in the range of 0±5° even when the extension direction of the flow passage 41b is not completely parallel to the first direction DR1. The mixed gas sucked from the intake opening 41a is supplied into the chamber 41 through the flow passage 41b.

The flange 41c projects from the outer peripheral surface of the flow passage 41b, for example, in a plane orthogonal to the first direction DR1. From another viewpoint, the flange 41c is parallel to the side plate 10b and the side plate 10c.

The outer peripheral surface of the flange 41c is provided with a convex portion 41cc (a second convex portion). The convex portion 41cc protrudes from the outer peripheral surface of the flange 41c in the radial direction of the flange 41c. The screw hole 41f is provided on the side of the opening part 10d in the chamber 41.

<Connection of Fan and Chamber>

As shown in FIGS. 20 to 23, the chamber 41 and the fan 42 are connected to each other by a sandwiching member 7.

The flange 41c and the flange 42f are in contact with each other. Accordingly, the intake opening 41a and the discharge opening 42d communicate with each other. In a state in which the flange 41c and the flange 42f are in contact with each other, the convex portion 41cc and the convex portion 42ff oppose each other.

The flange 41c and the flange 42f are sandwiched by the sandwiching member 7 in the first direction DR1. The mixed gas flows through the flow passage 41b and the flow passage 42e in the first direction DR1 and is supplied into the chamber 41 in the first direction DR1.

The sandwiching member 7 includes a through-hole 71, an insertion hole 72, and a positioning hole 73. The sandwiching member 7 is secured to the chamber 41 in such a manner that a screw 8 is inserted into the through-hole 71 and is threaded into the screw hole 41f. That is, the sandwiching member 7 is secured to the side of the opening part 10d in the chamber 41.

Figure 24:
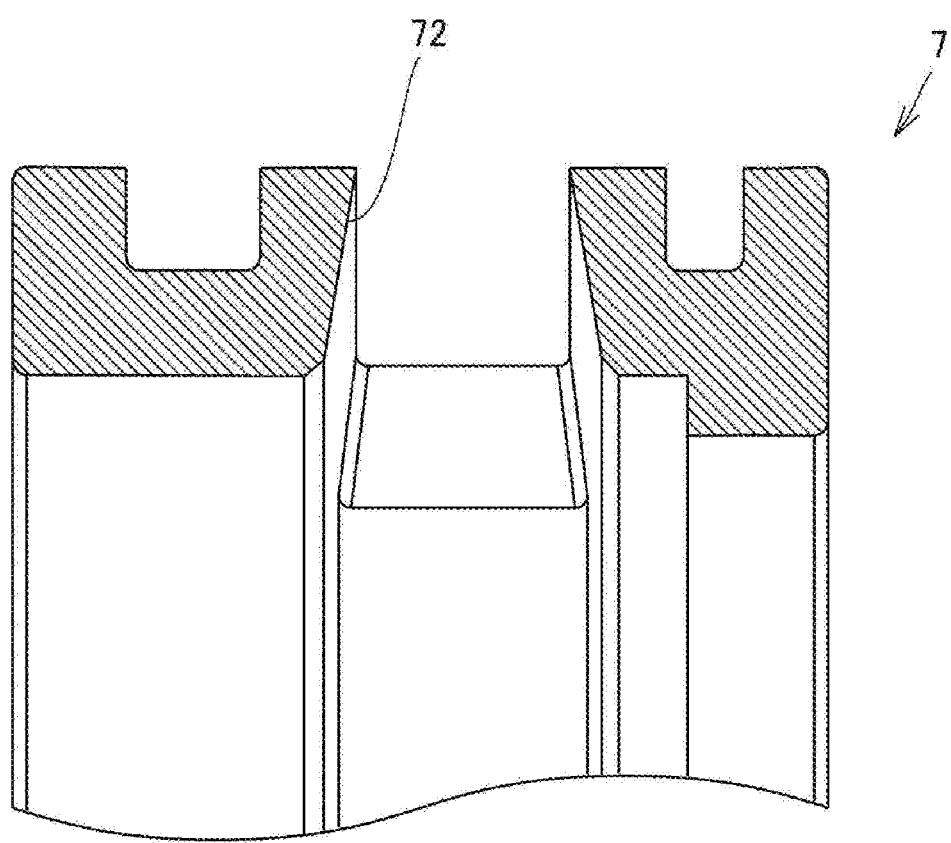
FIG. 24 is a cross-sectional view parallel to a first direction DR1 of a sandwiching member 7 of the water heating device 200 according to the embodiment.

The convex portion 41cc and the convex portion 42ff are inserted into the insertion hole 72. Accordingly, the relative rotation of the flange 42f with respect to the flange 41c in the circumferential direction is regulated. As shown in FIG. 24, the width of the insertion hole 72 in the first direction DR1 becomes narrow as it goes away from the base end portions of the convex portion 41cc and the convex portion 42ff.

The positioning pin 42g is inserted into the positioning hole 73. Accordingly, the relative rotation of the flange 42f with respect to the flange 41c in the circumferential direction is regulated.

Figure 22:
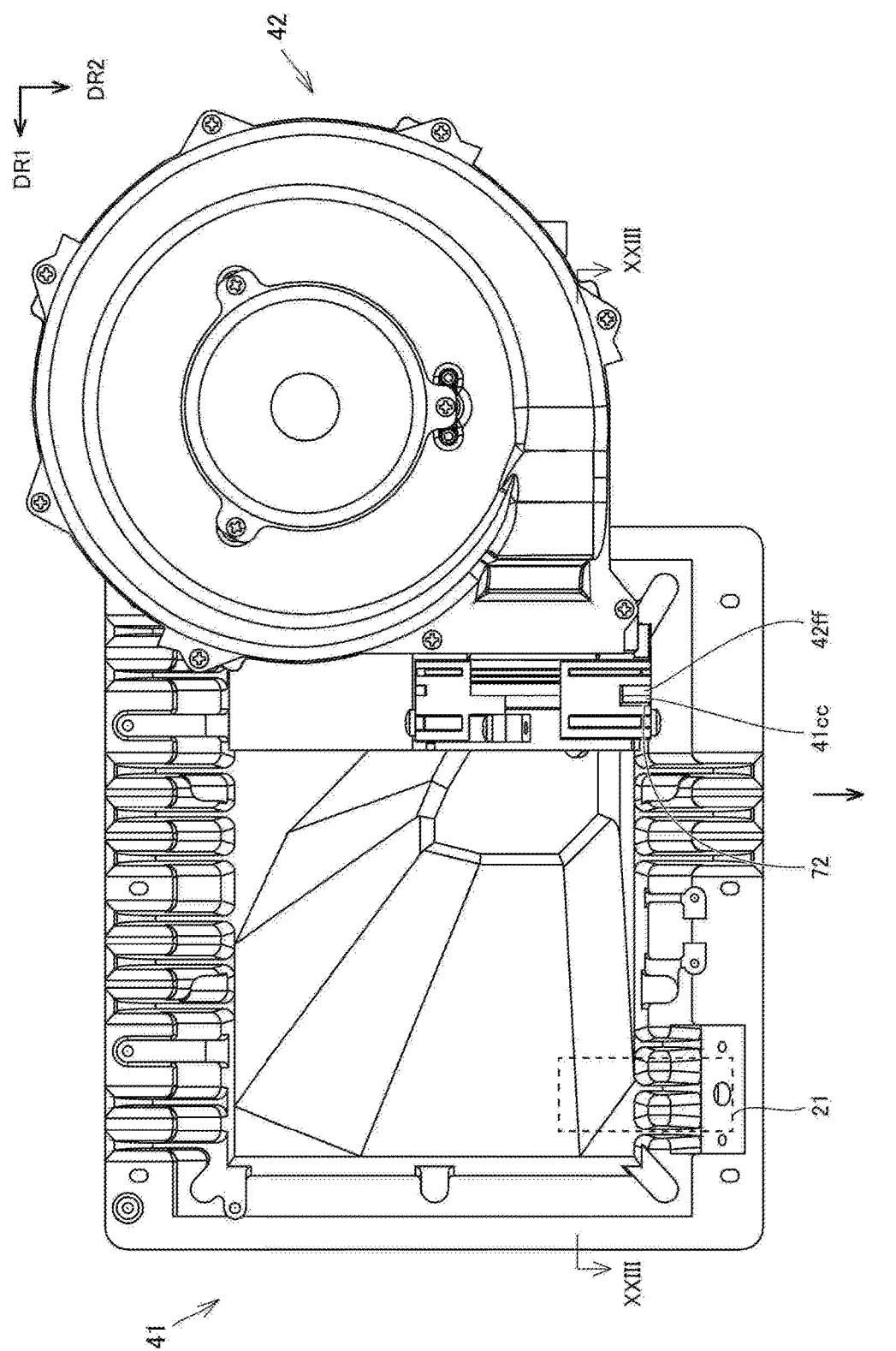
FIG. 22 is a planar view of the chamber 41 and the fan 42 of the water heating device 200 according to the embodiment.
Figure 23:
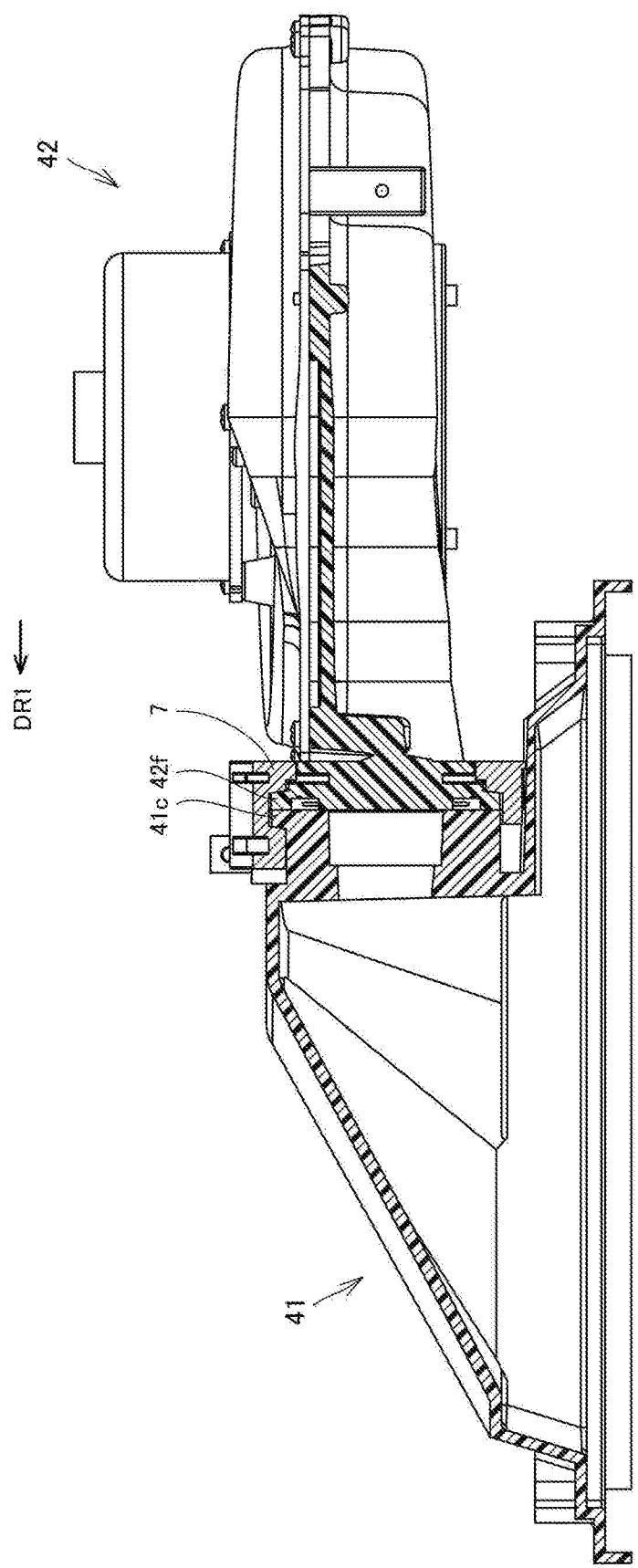
FIG. 23 is a cross-sectional view of XXIII-XXIII of FIG. 22.

As shown in FIG. 22, the spark plug 21 is located on the side of the opening part 10d in the chamber 41 in a planar view. Additionally, a "case in which the spark plug 21 is located on the side of the opening part 10d in the chamber 41 in a planar view" means that the spark plug 21 is located closer to the opening part 10d than the center of the chamber 41 in the second direction DR2 in a planar view.

The fan 42 is disposed on the side of the side plate 10b in the housing 10. The chamber 41 is disposed on the side of the side plate 10c in the housing 10.

The flow passage 41b and the flow passage 42e are located on the side of the opening part 10d in the chamber 41 in a planar view. Additionally, a "case in which the flow passage 41b and the flow passage 42e are located on the side of the opening part 10d in the chamber 41 in a planar view" means that the flow passage 41b and the flow passage 42e are located closer to the opening part 10d than the center of the chamber 41 in the second direction DR2 in a planar view.

In the description above, a case has been exemplified in which the sandwiching member 7 is secured to the side of the opening part 10d in the chamber 41, but the sandwiching member 7 may be secured to the side of the opening part 10d in the fan 42 or may be secured to both the side of the opening part 10d in the chamber 41 and the side of the opening part 10d in the fan 42.

(Effect of Water Heating Device 200 of Embodiment)

Hereinafter, an effect of the water heating device 200 of the embodiment will be described.

<Basic Effect>

In the water heating device 200, the flow passage 41b and the flow passage 42e extend in the first direction DR1. Therefore, the mixed gas discharged from the fan 42 is sucked into the chamber 41 in the first direction DR1.

In the water heating device 200, the sandwiching member 7 sandwiches the flanges 41c and 42f and is secured to at least one of the chamber 41 and the fan 42 on the side of the opening part 10d in the housing 10. Therefore, an operator can easily connect the chamber 41 and the fan 42 to each other through the opening part 10d of the housing 10.

In this way, according to the water heating device 200, the mixed gas can be supplied into the chamber 41 in the first direction DR1 and the chamber 41 and the fan 42 can be easily connected to each other through the opening part 10d provided in the housing 10.

<Auxiliary Effect>

Since the flow passage 41b and the flow passage 42e are located on the side of the opening part 10d in the chamber 41 and the spark plug 21 is located on the side of the opening part 10d in the chamber 41, the mixed gas can be easily supplied to the vicinity of the spark plug 21 and the igniting performance of the burner 40 can be improved.

Since the relative rotation of the flange 42f with respect to the flange 41c in the circumferential direction is suppressed by inserting the convex portion 41cc and the convex portion 42ff into the insertion hole 72, the assemblability of the water heating device is improved.

Since the width of the insertion hole 72 in the first direction DR1 becomes wide as it goes toward the base end portions of the convex portion 41cc and the convex portion 42ff, the convex portion 41cc and the convex portion 42ff can be easily inserted into the insertion hole 72. Further, since the width of the insertion hole 72 in the first direction DR1 becomes narrow as it goes away from the base end portions of the convex portion 41cc and the convex portion 42ff, the convex portion 41cc and the convex portion 42ff are pressed against each other in the first direction DR1 by the insertion hole 72 after the convex portion 41cc and the convex portion 42ff are once inserted into the insertion hole 72. As a result, the adhesion of the flange 41c and the flange 42f can be improved.

Since the relative rotation of the flange 42f with respect to the flange 41c in the circumferential direction is suppressed by inserting the positioning pin 42g into the positioning hole 73, the assemblability of the water heating device is improved.

In the water heating device 200, when the sandwiching member 7 is secured to both the side of the opening part 10d in the chamber 41 and the side of the opening part 10d in the fan 42, the sandwiching member 7 is secured to both the chamber 41 and the fan 42. Accordingly, since the relative rotation of the flange 41c with respect to the flange 42f in the circumferential direction is suppressed, the assemblability of the water heating device is improved.

Although the embodiment of the invention has been described above, the above-described embodiment can be modified into various forms. Further, the scope of the invention is not limited to the above-described embodiment. The scope of the invention is expressed by the claims and is intended to include all modifications within the meaning and scope equivalent to the claims.

INDUSTRIAL APPLICABILITY

The above-described embodiment is particularly advantageously applied to a water heating device.

REFERENCE SIGNS LIST

10 Housing
10a Back plate
10b Side plate
10c Side plate
10d Opening part
20 Primary heat exchanger 21 Spark plug
30 Secondary heat exchanger
40 Burner
41 Chamber
41a Intake opening
41b Flow passage
41c Flange
41ca Third surface
41cb Fourth surface
41cc Convex portion
41d Concave portion
41da Bottom surface
41db Screw hole
41e Flat surface portion
41f Screw hole
42 Fan
42a Fan housing
42b Impeller
42c Motor
42d Discharge opening
42e Flow passage
42f Flange
42fa First surface
42fb Second surface
42fc Seat surface portion
42fd Through-hole
42fe Flat surface portion
42ff Convex portion
42g Positioning pin
43 Duct
44 Venturi
45 Orifice
46 Gas valve
50a, 50b, 50c, 50d, 50e, 50f, 50g Pipe
51a, 51b Bypass pipe
52 Bypass servo
6 Screw
6a Head portion
6b Tip-end portion
7 Sandwiching member
71 Through-hole
72 Insertion hole
73 Positioning hole
8 Screw
DR1 First direction
DR2 Second direction
VL Virtual line
100, 200 Water heating device

What is claimed is:

1. A water heating device comprising:
a housing which comprises a back plate, and a first side plate and a second side plate opposing each other in a first direction and extending from both side ends of the back plate in a second direction intersecting the first direction and in which an opening part is provided on a side opposite to the back plate in the second direction;
a fan and a chamber which are disposed in the housing; and
a screw,
wherein the fan comprises a discharge opening, a first flow passage which extends in the first direction toward the discharge opening, and a first flange which is provided in the discharge opening to project from an outer peripheral surface of the first flow passage,
the chamber comprises an intake opening, a second flow passage which extends in the first direction from the intake opening, and a second flange which is provided in the intake opening to project from an outer peripheral surface of the second flow passage,
the first flange and the second flange are secured to each other by the screw while the discharge opening and the intake opening are in contact with each other in a communication state,
the screw comprises a bead portion and a tip-end portion which is connected to the head portion,
a center axis of the screw is slanted so that the head portion side is closer to the opening part than the tip-end portion side in a planar view, and
the first flange and the second flange are parallel to the first side plate and the second side plate.

2. The water heating device according to claim 1, wherein the first flange comprises a first surface which is in contact with the second flange and a second surface which is a surface on the side opposite to the first surface, and
the second surface comprises a seat surface portion which is provided with a through-hole through which the screw is inserted and is slanted to intersect the center axis of the screw in a planar view.

3. The water heating device according to claim 1, wherein the center axis of the screw is slanted so that a virtual line formed by extending the center axis of the screw passes through the opening part in a planar view.

4. The water heating device according to claim 1, wherein the second flange comprises a third surface which is in contact with the first flange,
the third surface comprises a concave portion, and
a bottom surface of the concave portion is provided with a screw hole into which the screw is threaded.

5. The water heating device according to claim 4, wherein the screw hole penetrates the second flange.

6. The water heating device according to claim 1, wherein an outer peripheral surface of the first flange comprises a first flat surface portion, and
the chamber comprises a second flat surface portion which is in contact with the first flat surface portion.

7. A water heating device comprising:
a housing which comprises a back plate, and a first side plate and a second side plate opposing each other in a first direction and extending from both side ends of the back plate in a second direction intersecting the first direction and in which an opening part is provided on a side opposite to the back plate in the second direction;
a fan and a chamber which are disposed in the housing; and
a sandwiching member,
wherein the fan comprises a discharge opening, a first flow passage which extends in the first direction toward the discharge opening, and a first flange which is provided in the discharge opening to project from an outer peripheral surface of the first flow passage,
the chamber comprises an intake opening, a second flow passage which extends in the first direction from the intake opening, and a second flange which is provided in the intake opening to project from an outer peripheral surface of the second flow passage,
the first flange and the second flange are in contact with each other so that the discharge opening and the intake opening communicate with each other,
the sandwiching member sandwiches the first flange and the second flange in the first direction and is secured to at least one of a portion of the chamber facing the opening part and a portion of the fan facing the opening part, and the first flange and the second flange are parallel to the first side plate and the second side plate.

8. The water heating device according to claim 7, wherein an outer peripheral surface of the first flange is provided with a first convex portion, an outer peripheral surface of the second flange is provided with a second convex portion, the first flange and the second flange are in contact with each other so that the first convex portion and the second convex portion oppose each other, and the sandwiching member is provided with an insertion hole into which the first convex portion and the second convex portion are inserted.

9. The water heating device according to claim 8, wherein a width of the insertion hole in the first direction becomes narrow as it goes away from base end portions of the first convex portion and the second convex portion.

10. The water heating device according to claim 7, wherein a positioning pin is provided in the outer peripheral surface of the first flow passage to protrude from the outer peripheral surface of the first flow passage, the sandwiching member is secured to the opening part side of the chamber, and the sandwiching member is provided with a positioning hole into which the positioning pin is inserted.

11. The water heating device according to claim 7, wherein the sandwiching member is secured to both the opening part side of the chamber and the opening part side of the fan.

12. The water heating device according to claim 1, further comprising:

a spark plug, wherein the spark plug is disposed on the opening part side in a planar view, and the first flow passage and the second flow passage are disposed on the opening part side in a planar view.

* * * * *